United States Patent
Carmack et al.

(10) Patent No.: US 9,824,232 B1
(45) Date of Patent: Nov. 21, 2017

(54) SYSTEM FOR PROVIDING MESSAGES THROUGH MEDIA CONTENT

(71) Applicant: AMAZON TECHNOLOGIES, INC., Seattle, WA (US)

(72) Inventors: Scott Gerard Carmack, Mercer Island, WA (US); Narasimha Rao Lakkakula, Bothell, WA (US); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 14/860,408

(22) Filed: Sep. 21, 2015

(51) Int. Cl.
G06F 21/64 (2013.01)
G06F 21/62 (2013.01)
G06F 17/30 (2006.01)
H04L 29/12 (2006.01)

(52) U.S. Cl.
CPC .... *G06F 21/6218* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 2012/0151347 A1* | 6/2012 | McClements, IV . | G06Q 10/101 715/716 |
| 2012/0159391 A1* | 6/2012 | Berry ................... | A61B 5/4824 715/823 |
| 2012/0317213 A1* | 12/2012 | Zhang ................. | H04L 12/5815 709/206 |
| 2013/0117692 A1* | 5/2013 | Padmanabhan .... | H04N 21/4126 715/753 |
| 2013/0317936 A1* | 11/2013 | Hughes ................. | G06Q 30/06 705/26.5 |
| 2014/0047022 A1* | 2/2014 | Chan ..................... | G06F 17/241 709/204 |
| 2014/0092127 A1* | 4/2014 | Kruglick ........... | G06F 17/30038 345/629 |
| 2014/0289603 A1* | 9/2014 | Subrahmanya ....... | G06F 17/241 715/230 |
| 2014/0289611 A1* | 9/2014 | Norwood .............. | H04L 51/046 715/234 |
| 2015/0046809 A1* | 2/2015 | O'Donoghue ........ | G06F 3/0483 715/716 |

(Continued)

FOREIGN PATENT DOCUMENTS

WO    WO 2008112932 A2 *    9/2008    ............. H04L 67/02

*Primary Examiner* — Venkat Perungavoor
(74) *Attorney, Agent, or Firm* — Lindauer Law, PLLC

(57) ABSTRACT

Described are techniques for associating messages with a particular portion of media content. A message received from a first device, associated with a portion of media content stored on the first device, may be provided to a second device and stored in association with a corresponding portion of media content on the second device. Content consumption data associated with the second device may indicate whether the second device has previously accessed the portion of the media content. The message may be suppressed from presentation if the second device has not previously accessed the corresponding portion of the media content. The message may be presented to the second device when the corresponding portion of the media content is accessed.

20 Claims, 8 Drawing Sheets

(56) References Cited

U.S. PATENT DOCUMENTS

| | | | | |
|---|---|---|---|---|
| 2015/0213238 A1* | 7/2015 | Farha | ................... | G06F 21/10 |
| | | | | 726/30 |
| 2015/0213532 A1* | 7/2015 | Riihola | .............. | G06Q 30/0613 |
| | | | | 705/26.41 |
| 2015/0234887 A1* | 8/2015 | Greene | ................. | G06F 17/241 |
| | | | | 707/736 |
| 2015/0317050 A1* | 11/2015 | Landau | ................. | G06Q 10/10 |
| | | | | 715/738 |
| 2015/0339034 A1* | 11/2015 | Garcia | ................. | G06F 17/241 |
| | | | | 715/738 |
| 2015/0370768 A1* | 12/2015 | Tigchelaar | .............. | G06F 17/24 |
| | | | | 715/254 |

* cited by examiner

SYSTEM FOR PROVIDING MESSAGES THROUGH MEDIA CONTENT

BACKGROUND

Users accessing the Internet or other sources of data may be exposed to information relating to media content that has not been previously accessed by the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
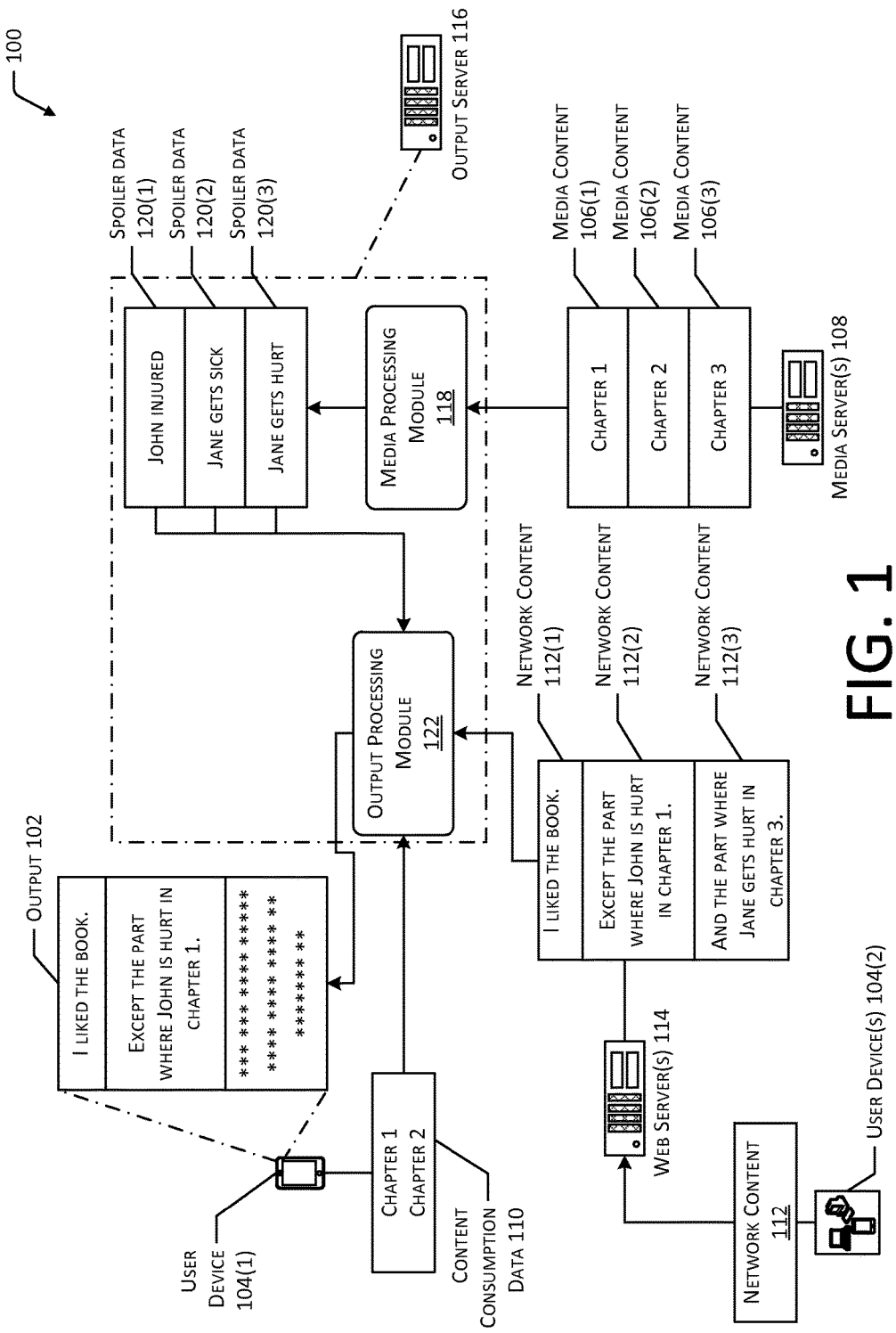
FIG. 1 depicts a system for affecting an output provided to a user device based on media content previously accessed by the user device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Using the Internet or other networks, users may access a large variety of media content such as e-books, videos, music, and other types of alphanumeric data, audio data, image data, and video data. Different users may consume different media content at different times. For example, users that reside in different time zones may view an episode of a television show at different times. As another example, a first user may view a video file, such as a movie, continuously, while a second user may view a portion of the movie at a first time, and then later view the remainder of the movie at a second time. As yet another example, a parent may read an e-book at a first time, and then several years later, that parent's child may read the same e-book. At any particular time, a first user may have previously accessed portions of media content that have not yet been accessed by a second user. Similarly, the second user may have accessed portions of media content not previously accessed by the first user. Users may exchange information relating to media content using the Internet or other networks. However, if a user accessing the Internet or another network encounters information relating to media content that the user has not previously accessed, this information may not be relevant to the user. Additionally, exposure to this information may inform the user of portions of the media content that the user has not yet experienced, thus "spoiling" that media content for that user.

Described in this disclosure are techniques for outputting content to a user, or suppressing content from output, based on the portions of media content previously accessed by the user. For example, if a user has previously accessed the first ten chapters of an e-book, information relating to chapter twelve of that e-book, encountered when the user accesses an online review of the e-book, may be suppressed from display. As another example, if a user has accessed the first four episodes of a television series, information relating to the fifth episode of that television series may be suppressed from presentation during that user's browser session. Continuing the example, search interfaces presented to the user may be prevented from outputting suggested search queries that include information relating to the fifth episode. Similarly, information relating to the fifth episode found in one or more webpages may be suppressed from display by the user's browser interface.

Existing media content may be processed to generate spoiler data that is indicative of alphanumeric data, audio data, image data, or video data found within the media content. Spoiler data may include information indicative of the content of one or more media objects. For example, spoiler data may include words, phrases, images, or sounds that may inform a user of events, plots, characters, and so forth, within a book, movie, or other type of media object. This information (e.g., "spoilers") may inform the user of the content of a media object when the user has not yet been exposed to the media object, thereby hindering the user's enjoyment of that media object. Spoiler data may include media content not yet presented to a user, such as quotes or excerpts from a book, scenes from a movie, and so forth. Spoiler data may also include content descriptive of media content, such as synopses, reviews, summaries, articles, and so forth, that may inform a user of media content using alternate language or formats. For example, an article describing the events of an episode of a television series, using text, may include spoiler data if the text of the article is determined to describe scenes or speech that occur in the episode. To generate spoiler data, natural language processing may be used in conjunction with the text of an e-book or the text found in captions of an image file or video file to determine information relating to the plot, events, or other contents of an e-book, movie, or other media content. As another example, speech-to-text processing may be used in conjunction with audio or video files, and natural language processing may be used in conjunction with the resulting text. As yet another example, audio and image recognition techniques may be used in conjunction with audio data, image data, and video data to determine events that occur in audio or video content. The resulting spoiler data may, therefore, be indicative of information associated with portions of the media content. In some implementations, spoiler data may be determined based on correspondence between the media content and particular words, sounds, images, and so forth. For example, certain words, such as "shot" or "kiss", or certain sounds, such as a gunshot or explosion, may be determined as spoiler data when present in media content. As another example, words, sounds, images, or phrases unique to particular media content or uncommon among media content, such as names of characters, places, and so forth, may be determined to include spoiler data. Common words, such as "a", "an", "the", and other words common in many media objects and other sources describing media objects may be disregarded and assumed not to include spoiler data. In some implementations, spoiler data may be determined using additional sources of data. For example, a third party associated with media content (e.g., an author, publisher, distributor, producer, illustrator, etc.) may provide certain terms, images, or sounds that include spoiler data. As another example, external sources, such as reviews or summaries, may indicate that they contain spoilers or that they are descriptive of certain media content. Terms found in such external sources may be determined to include spoiler data.

Content consumption data associated with the user may also be determined. Content consumption data may indicate the portions of media content previously accessed by the user. For example, if a user has previously accessed entire e-books, movies, and television episodes, the content consumption data may indicate this previous access. Additionally, the content consumption data may indicate access to particular portions of media content. For example, if a user has accessed the first 172 pages of a 360-page e-book or viewed the first 72 minutes of a 127-minute movie, the content consumption data may indicate access to these portions of the media content. In some implementations, the position of an electronic "bookmark" within an e-book or the location at which a user paused a video file may be used to determine portions of the media content previously accessed by the user. In some implementations, content consumption data may include an indication of media content that has not been previously accessed by a user, but is related to previously-accessed media content. For example, a user may purchase and access at least a portion of an e-book. The content consumption data associated with that user may include an indication of the portions of the e-book accessed by the user, as well as corresponding portions of an audio book, not previously accessed by the user, that includes the same content in an alternate format.

When a user accesses network content, correspondence between the network content and the spoiler data may indicate that the network content contains spoiler information relating to the media content. For example, network content may include text, audio, or video data associated with media content, such as reviews, summaries, discussions, promotional materials, and so forth that may inform users of events, characters, or other elements within particular media content. For example, a user may access network content found on one or more webpages by using a browser. In some implementations, the browser may at least partly process network content on the user device(s) and partly on one or more other computing devices. All or a portion of the accessed network content may include potential spoiler information. For example, a user may access one or more reviews of an e-book. A first review that simply states "I enjoyed this book" would not correspond to the spoiler data. However, a second review that describes, "I cried when John was injured in chapter three" may include spoiler data determined from the media content, based on the term "John" in the same sentence as the term "injured" within the network content.

Correspondence between the network content and the user's content consumption data may also be determined. For example, if the content consumption data indicates that the user has previously accessed the portion of the e-book during which John died, then correspondence between the network content and the content consumption data would be determined. However, if the content consumption data does not indicate that the user has previously accessed this portion of the e-book, a difference between the network content and the content consumption data would be determined.

Based on the correspondence between network content and the spoiler data, and the difference between network content and the content consumption data, at least a portion of the network content may be suppressed from output or otherwise modified. For example, network content may be provided with a notification, which may warn the user that the network content may include spoiler information. As another example, portions of the network content that do not contain spoiler information may be presented, while other portions of the network content that contain spoiler information may be suppressed from presentation or obfuscated. As yet another example, network content that is determined to contain spoiler information that does not correspond to a user's content consumption data may be suppressed from output entirely. In some implementations, a user may provide user input selecting a level of suppression indicating the manner in which network content may be suppressed for particular media content. For example, a user may elect to suppress all content relating to a television series of particular interest to the user. As another example regarding an e-book of no interest to a user, the user may elect not to suppress any content. As yet another example, a user may elect to obfuscate content relating to a particular movie, but the user may be permitted to select or otherwise indicate an obfuscated portion of the content to access and read that portion of the content.

In some implementations, the presence of spoiler information in network content output to a user may be determined based on the source of the network content. For example, content consumption data associated with a first user account that generated the network content may indicate that the first user account has accessed content that a second user account viewing the network content has not accessed. Therefore, network content generated by the first user may be determined to include spoiler information with regard to the second user, based on the access of the first user to media content not previously accessed by the second user. As another example, network content may include associated rating data. The rating data may be indicative of user input provided responsive to the network content or to the user account that generated the network content. The rating data may indicate that the network content includes spoiler information. As yet another example, network content or spoiler data may be provided by the author or distributor of media content. Continuing the example, the distributor of the movie may provide spoiler data relating to the movie in addition to or in lieu of the spoiler data determined by analyzing the movie using language, video, and audio processing techniques. In some cases, particular network content may be excepted from spoiler data. For example, the distributor of a movie may provide a trailer or commercial for the movie and may designate that the trailer or commercial is excepted from the spoiler data independent of the content of the trailer or commercial.

In some implementations, the network content may include messages generated by a user to be provided to one or more other users, through media content. A first user may generate a message associated with a first portion of media content, such as a particular section of an e-book (e.g., a word, line, or page) or a particular part of a movie (e.g., a selected point denoted by one or more timestamps). This message may include message content, such as the user's reaction to the media content or a communication intended for one or more recipients. The message may also include an identification of the one or more recipients intended to receive the message. However, this message may be suppressed from output to one or more of the intended recipients based on the content consumption data associated with those recipients.

For example, a first user reading an e-book on a first device may select a sentence that corresponds to an event within the story, input message content that includes alphanumeric data related to the event, and input an identifier associated with a family member intended to receive the message content. The message may be provided to a second device associated with the intended recipient and stored in association with the same portion of the same media content on the recipient's device. The content consumption data associated with the recipient may be used to determine whether the recipient has previously accessed the portion of the media content associated with the message. If the recipient has not yet accessed this portion of the media content, the message may not be output. When the recipient accesses this portion of the media content at a future time, such as by continuing to read the e-book until that portion is reached, the message may be output to the user at the future time.

In some implementations, message content may be output automatically when the recipient accesses the associated portion of the media content. In other implementations, an indication of the message content may be provided for selection by the user, responsive to which the message content may be presented. For example, an indicator may include one or more characteristics indicative of the source of the message, the content of the message, a category or type corresponding to the message, a category or type corresponding to the user account that generated the message, rating data associated with the message or with the user account that generated the message, and so forth. A user may provide user input indicating particular sources of messages or particular types of messages that may be output automatically and sources or types of messages that may require user confirmation (e.g., by selecting a message indication) prior to output.

In some implementations, a user generating a message may designate one or more particular recipients or groups of recipients to receive the message. In some cases, the particular users that may access a message may dynamically change as a group of users changes. For example, a parent may designate a message for receipt by a child or for receipt by all of that parent's family members. If other users, such as a newly born child, become part of a user group of family members at a future date, that child may access previously-generated messages associated with the user group. Continuing the example, a parent may generate messages that may be received in the future by a child that is not yet born, when the child accesses media content, possibly at a time after the parent has died. As another example, a user may designate a message for receipt by all users associated with that user within a particular social network. If the user adds other users to his or her social network at a future time, those added users may access previously-generated messages that are associated with that user's social network. In other implementations, a user generating a message may designate that the message is a public message that may be accessed by any recipient that chooses to access the message. For example, an author or celebrity may generate messages to be accessed by the general public.

In some implementations, a user may provide subscription data indicative of one or more sources of messages or types of messages that the user desires to receive. For example, a user may indicate particular celebrities, particular family members or friends, or other particular sources of messages. Messages provided by the selected sources may be output to the user, while messages associated with sources that are not included in the subscription data may not be provided to the user's device or may be suppressed from output. As another example, a user may indicate particular types of messages to be output or suppressed. Continuing the example, messages relating to a particular e-book of interest to the user may be output, while messages relating to a second e-book of less interest to the user may not be provided to the user's device or may be suppressed from output. As another example, a user may elect to receive messages relating to substantive discussion of the content of a movie, while messages relating to humorous content or off-the-cuff responses to the movie may not be provided to the user's device or may be suppressed from output. In other implementations, the subscription data may indicate one or more threshold ratings associated with media content. For example, user input providing a rating value to one or more messages may be determined. A user may select to receive messages having a rating equal to or exceeding a threshold rating, a particular quantity of highly-rated messages (e.g., the ten highest rated messages for a particular e-book), a percentage of highly-rated messages (e.g., the highest-rated ten percent of messages associated with the particular e-book), and so forth. Messages having associated rating data that corresponds to the subscription data may be output, while messages that do not have corresponding rating data may not be provided to the user's device or may be suppressed from output. In other implementations, a user may provide filter data indicative of one or more sources of messages, types or categories of messages, or message content to be suppressed from output. Correspondence between the filter data and the source, type, or content of a message may result in the message not being provided to the user's device or being suppressed from output.

Implementations usable within the scope of the present disclosure may thereby suppress content, including messages from other users, from output to a user based on the media content previously accessed by that user.

FIG. 1 depicts a system 100 for affecting an output 102 provided to a user device 104(1) based on media content 106 previously accessed by the user device 104(1). The user device 104(1) may include any manner of computing device capable of outputting media content 106, such as mobile devices, set-top boxes, tablet computers, personal computers, wearable computers, servers, and so forth. For example, a user device 104(1) may include one or more displays, speakers, haptic elements, or other output devices for outputting media content 106 and other information. One or more media servers 108 may store media content 106, which may be accessible to one or more user devices 104(1). For example, the media server(s) 108 may include media content 106 associated with a user account. The user device 104(1) associated with the user account may communicate with the media server(s) 108 via one or more networks to receive selected media content 106 from the media server(s) 108 for output or local storage. In other implementations, the user device 104(1) or one or more other data storage media may be used to store the media content 106 locally and use of the media server(s) 108 may be omitted. The media server(s) 108 may include any type of computing devices including, but not limited, to those described with regard to the user device 104(1).

The media content 106 may include any manner of alphanumeric data, audio data, image data, or video data. For example, media content 106 may include e-books, articles, other types of publications, movies, episodes of television series, other videos, comics, other illustrated media, music, soundtracks, broadcast speeches or debates, and so forth. For example, FIG. 1 depicts media content 106 associated with an e-book. First media content 106(1) may include a first chapter of the e-book, second media content 106(2) may include a second chapter of the e-book, and third media content 106(3) may include a third chapter of the e-book. The user device 104(1) or one or more other computing devices in association therewith may generate and store content consumption data 110 indicative of the media content 106 previously accessed by the user device 104(1). For example, the user device 104(1) may have previously accessed the first media content 106(1) and the second media content 106(2) (e.g., "Chapter 1" and "Chapter 2" of the e-book, respectively), but not the third media content 106(3) (e.g., "Chapter 3" of the e-book).

The user device 104(1) may also access network content 112 associated with one or more web servers 114. For example, the user device 104(1) may initiate a browser session and communicate with the web server(s) 114 via one or more networks. The web server(s) 114 may include any type of computing devices including, but not limited, to those described with regard to the user device 104(1). The web server(s) 114 may be configured to render the network content 112 for output on the user device 104(1). The network content 112 may include any manner of alphanumeric data, image data, audio data, or video data able to be output by the user device 104(1). For example, the network content 112 may include one or more text, audio, or video reviews of the media content 106 provided to the web server(s) 114 by one or more other user devices 104(2). A user device 104(1) accessing network content 112 related to particular media content 106 that the associated user has not previously accessed may cause the user to be informed of that media content 106, thus spoiling that media content 106. Additionally, the network content 112 may lack relevance due to the user's lack of exposure to the particular media content 106. For example, FIG. 1 depicts network content 112 that includes a review of the e-book associated with the depicted media content 106. First network content 112(1) includes a first portion of the review discussing general perceptions of the media content 106. Second network content 112(2) includes a second portion of the review that discusses a specific event from the first media content 106(1) (e.g., an event from "Chapter 1" of the e-book). Third network content 112(3) includes a third portion of the review that discusses a specific event from the third media content 106(3) (e.g., an event from "Chapter 3" of the e-book).

An output server 116 may be used to generate or modify the output 102 that is provided to the user device 104(1) to prevent the output of network content 112 associated with media content 106 not previously accessed by the user device 104(1). The output server 116 may include any type of computing device including, but not limited, to those described with regard to the user device 104(1). A media processing module 118 associated with the output server 116 may determine media content 106 from the media server(s) 108 and generate spoiler data 120 based on the media content 106. For example, the media processing module 118 may include any manner of text recognition or natural language processing software, which may be used to process alphanumeric data contained in the media content 106. Alphanumeric data may include text of e-books, captions associated with an image file or video file, and so forth. In some implementations, the media processing module 118 may perform optical character recognition (OCR) to determine text contained within image data or video data of the media content 106. In other implementations, the media processing module 118 may perform speech-to-text processing to generate text based on audio data contained within the media content 106. In still other implementations, the media processing module 118 may include audio recognition software or video recognition software that may be used to determine specific audio or video content within the media content 106. For example, audio recognition software may include speech recognition or speech-to-text software. As another example, audio recognition software may determine other non-speech sounds, such as gunshots, explosions, crying, music, and so forth. The spoiler data 120, determined by the media processing module 118 and based on the media content 106, may include information relating to plots, characters, events, endings, and so forth, within the media content 106. Exposure to network content 112 that describes these plots, characters, events, or endings, by a user that has not yet experienced the associated media content 106, may reduce the enjoyment of the media content 106 by the user. Additionally, the network content 112 may lack relevance to the user at the time that the network content 112 is accessed. For example, a discussion of the events occurring within the third episode of a television series would be of lesser relevance to a user that has not yet viewed the third episode. FIG. 1 depicts spoiler data 120 that includes events associated with the example media content 106. The first spoiler data 120(1) includes an event that occurs in the first media content 106(1) (e.g., the first chapter of the e-book), the second spoiler data 120(2) includes an event that occurs in the second media content 106(2) (e.g., the second chapter of the e-book), and the third spoiler data 120(3) includes an event that occurs in the third media content 106(3) (e.g., the third chapter of the e-book).

An output processing module 122 associated with the output server 116 may determine the network content 112 accessed by the user device 104(1) and generate or modify the output 102 based on the spoiler data 120 determined by the media processing module 118 and the content consumption data 110 determined from the user device 104(1). The output processing module 122 may perform any manner of text, video, audio, or image recognition, OCR, natural language processing, or other processing techniques on the network content 112, including, but not limited to, those described with respect to the media processing module 118. The output processing module 122 may also determine correspondence between the network content 112 and the spoiler data 120. Correspondence between the network content 112 and the spoiler data 120 may indicate that the network content 112 includes information that describes one or more events, plots, characters, endings, or other "spoilers" associated with the media content 106. For example, the output processing module 122 may determine that the first network content 112(1), e.g., "I liked the book," does not correspond to any of the spoiler data 120, since none of the terms of the spoiler data 120 occur in the first network content 112(1). The output processing module 122 may determine that the second network content 112(2) corresponds to the first spoiler data 120(1). For example, the second network content 112(2), e.g., "Except the part where John is hurt in chapter 1," includes terms that correspond to the first spoiler data 120(1), e.g., "John injured." This correspondence may indicate that the second network content 112(2) includes information that may spoil the first media content 106(1). The output processing module 122 may determine that the third network content 112(3) corresponds to the third spoiler data 120(3). For example, the third network content 112(3), e.g., "And the part where Jane gets hurt in chapter 3," includes terms that correspond to the third spoiler data 120(3), e.g., "Jane gets hurt." This correspondence may indicate that the third network content 112(3) includes information that may spoil the third media content 106(3).

The output processing module 122 may also determine the content consumption data 110 from the user device 104(1) indicative of media content 106 previously accessed by the user device 104(1). For example, the content consumption data 110 may indicate that the user device 104(1) has previously accessed the first media content 106(1) and the second media content 106(2), but not the third media content 106(3). The output processing module 122 may further determine one or more differences between the content consumption data 110 and the network content 112, indicating that the network content 112 is associated with media content 106 not previously accessed by the user device 104(1). Based on the correspondence between the network content 112 and the spoiler data 120, and based on the difference(s) between the content consumption data 110 and the network content 112, the output processing module 122 may generate or modify the output 102 provided to the user device 104(1).

For example, output processing module 122 may determine that the first network content 112(1) does not correspond to any of the spoiler data 120 determined from the media content 106. Therefore, the output 102 provided to the user device 104(1) may include the first network content 112(1). The output processing module 122 may determine that the second network content 112(2) corresponds to the first spoiler data 120(1) determined from the first media content 106(1). However, the output processing module 122 may determine, based on the content consumption data 110, that the user device 104(1) has previously accessed the first media content 106(1). Therefore, a difference between the content consumption data 110 and the second network content 112(2) would not be determined. The output 102 provided to the user device 104(1) may, therefore, also include the second network content 112(2). The output processing module 122 may determine that the third network content 112(3) corresponds to the third spoiler data 120(3) determined from the third media content 106(3). Additionally, because the user device 104(1) has not previously accessed the third media content 106(3), the output processing module 122 may determine a difference between the content consumption data 110 and the third network content 112(3). Therefore, the output 102 provided to the user device 104(1) may not include the third network content 112(3).

In some implementations, portions of the output 102 that correspond to the third network content 112(3) may be obfuscated. For example, text within the output 102 may be obfuscated by blurring, pixelating, or distorting characters, replacing text characters with other alternate text or symbols that does not form words, modifying the color of the text, outputting other text or images over the obfuscated text to obscure it from view, and so forth. Images within the output 102 may be obfuscated by blurring, pixelating, or otherwise modifying the image, such as modifying the colors thereof or the arrangement of pixels within the images. Audio data associated with the output 102 may be modified to distort sounds (e.g., by changing the frequency thereof), soften or mute sounds, obscure sounds with the addition of other sounds, such as static or white noise, and so forth. In other implementations, one or more portions of the output 102 may be provided with a notification or warning indicating that the output 102 may include information that could spoil the media content 106. In still other implementations, output of the network content 112 may be suppressed entirely if the presence of information that may spoil the media content 106 is determined.

Figure 2:
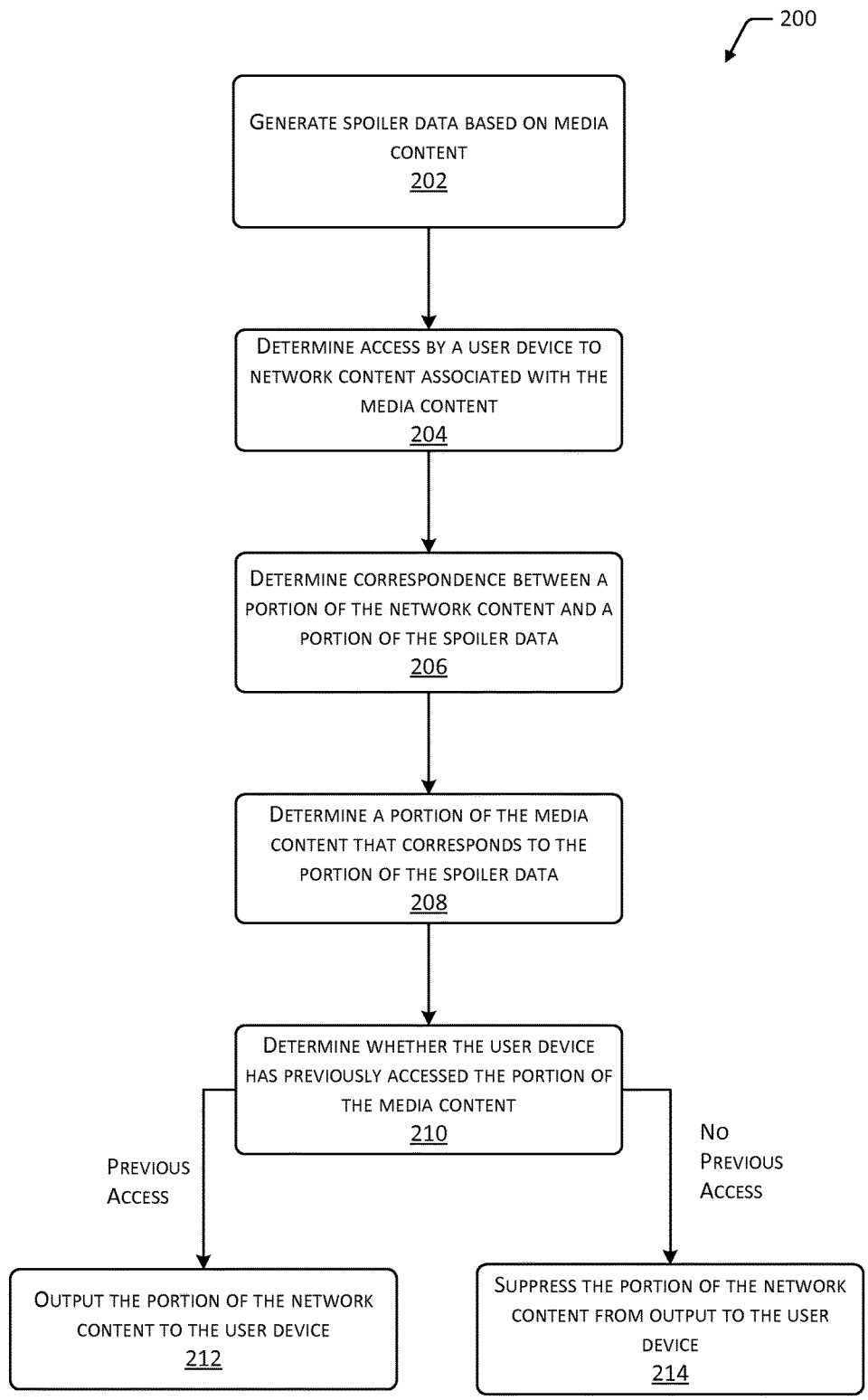
FIG. 2 is a flow diagram illustrating a method for affecting network content provided to a user device based on media content previously accessed by the user device.

FIG. 2 is a flow diagram 200 illustrating a method for affecting network content 112 provided to a user device 104 based on media content 106 previously accessed by the user device 104. Block 202 generates spoiler data 120 based on the media content 106. Spoiler data 120 may be generated by performing one or more of natural language processing, text recognition, speech-to-text processing, OCR, image recognition, video recognition, audio recognition, or other processing techniques on media content 106. The spoiler data 120 may correspond to the content of one or more media objects, such as words or phrases found within an e-book, audible speech within a song or movie, visible images, and so forth. In some implementations, spoiler data 120 may be determined by identifying particular words or phrases within alphanumeric data, images that correspond to scenes from a video or illustrations within a book, and so forth, that may be presumed to spoil content of a media object. For example, words describing the death of a character, romantic interactions, characters expressing surprise, and so forth, may be determined to be spoiler data 120. Other words or phrases that are used commonly, such as articles, common adjectives and nouns, generic expressions about media content 106 (e.g., "I liked the movie" or "This book rocked"), and so forth, may be disregarded as potential spoiler data 120. Continuing the example, the phrase "John was injured", within a review of an e-book may be determined as spoiler data 120. The phrase "John was injured" would be uncommon in reviews and may be determined to relate to the content of the e-book. In other implementations, words or phrases that are unique to a particular portion of media content 106 or not commonly used in other media content 106 or network content 112 may be presumed to spoil content of a media object. For example, a character in a book may be stung by a jellyfish. The topic of jellyfish stings may be uncommon among a large body of media content 106 and network content 112. Therefore, text relating to jellyfish stings may be determined to be spoiler data 120. As another example, names of characters or actors unique to a particular media object may be determined to be spoiler data 120.

In some implementations, spoiler data 120 may be determined using one or more additional sources of data. For example, an author or publisher of a book, a producer or distributor of a movie, or another entity associated with media content 106 may indicate particular words, phrases, images, sounds, and so forth, that may be used as spoiler data 120. As another example, users reading reviews or other network content 112 discussing a media object may flag or otherwise indicate that the network content 112 contains spoiler information. Responsive to this indication, the network content 112 may be parsed to determine text, images, sounds, and so forth, that may be used as spoiler data 120. As yet another example, particular network content 112 may include indications of spoiler content. Continuing the example, an article describing an episode of a television series may include a warning, reading "This article contains spoilers." In other cases, articles may include text indicating that the articles describe events or summarize the content of particular media objects. For example, an article may include text in quotation marks, indicating that a portion of a media object is being reproduced. If the same string of text is also included in the corresponding media content 106, the quoted text may be determined to include spoiler data 120. Based on these determinations, articles and similar network content 112 that includes these features may be parsed to determine text, images, sounds, and so forth, that may be used as spoiler data 120. In some implementations, machine learning algorithms may be used to dynamically modify lists of words that are presumed to indicate spoiler data 120 and words that are presumed not to include spoiler data 120. For example, machine learning may include use of one or more artificial neural networks (ANNs) or singular value decomposition (SVD) techniques.

Block 204 determines access by a user device 104 to network content 112 associated with the media content 106. For example, a user device 104 may be used to execute a browser application, which may access one or more websites or other types of information over a network. Example browser applications may include Mozilla Firefox®, produced by the Mozilla Corporation of Mountain View, Calif., USA; Microsoft Internet Explorer®, produced by the Microsoft Corporation of Redmond, Wash., USA; Google Chrome™, produced by Google, Inc. of Mountain View, Calif., USA; Apple Safari®, produced by Apple, Inc. of Cupertino, Calif., USA; Rockmelt®, owned by the Yahoo Corporation of Sunnyvale, Calif., USA; and so forth. Implementations may also support the use of a web browser, such as the Amazon Silk™ browser, produced by Amazon.com, Inc. of Seattle, Wash., USA, in which the processing of network content 112 is performed partly on user device(s) 104 and partly on one or more other computing devices. Continuing the example, a user device 104 may access a website discussing literary techniques used in an e-book, reviews of a movie or television series, or similar network content 112 associated with media content 106. In some implementations, the network content 112 associated with the media content 106 may not be accessed intentionally by a user of the user device 104. For example, a user inputting a search query into a search interface may receive auto-populated or suggested search terms, generated by the browser, the search interface, or another module. Continuing the example, a search interface may receive a large number of search queries relating to a particular episode of a television series shortly after the episode has been broadcast. This may result in the search interface auto-populating or suggesting search queries that relate to events that occur in that episode responsive to a user's entry of a partial search query. In some cases, these suggested search queries may reveal portions of media content 106 to a user that has not yet experienced the media content 106.

Block 206 determines correspondence between a portion of the network content 112 and a portion of the spoiler data 120. For example, the network content 112 may include one or more of alphanumeric data, audio data, image data, or video data. One or more of the techniques described above with regard to generation of the spoiler data 120 may be used to analyze the network content 112 to determine text, images, sounds, and so forth, present in the network content 112. Correspondence between a portion of the network content 112 and a portion of the spoiler data 120 may indicate that the network content 112 includes information regarding the media content 106 that may potentially spoil that media content 106 if output to a user.

Block 208 determines a portion of the media content 106 that corresponds to the portion of the spoiler data 120. Each portion of the spoiler data 120 may be determined based on a corresponding portion of the media content 106. For example, spoiler data 120 determined by performing natural language processing on a particular page, paragraph, sentence, phrase, or word of an e-book may include an indication of the portion of the media content 106 that corresponds to the spoiler data 120. Spoiler data 120 determined by performing image or video recognition on a video file may similarly include an indication of the portion of the media content 106 that corresponds to the spoiler data 120.

Block 210 determines whether the user device 104 has previously accessed the portion of the media content 106. As described previously with regard to FIG. 1, content consumption data 110 associated with the user device 104 may be determined. The content consumption data 110 may indicate portions of various media content 106 previously accessed by the user device 104. If correspondence between the content consumption data 110 and the portion of the media content 106 associated with the spoiler data 120 is determined, this correspondence may indicate that the user device 104 has previously accessed the portion of the media content 106. If correspondence between the content consumption data 110 and the portion of the media content 106 is not determined, this may indicate that the user device 104 has not previously accessed the portion of the media content 106.

If it is determined that the user device 104 has previously accessed the portion of the media content 106, block 212 may output the portion of the network content 112 to the user device 104. The network content 112 may be relevant to the user because the user associated with the user device 104 has previously experienced the portion of the media content 106 associated with the network content 112. Additionally, output of the network content 112 may not hinder the user's enjoyment of media content 106 that the user has not yet experienced.

If it is determined that the user device 104 has not previously accessed the portion of the media content 106, block 214 may suppress the portion of the network content 112 from output to the user device 104. Since the user associated with the user device 104 has not previously experienced the associated media content 106, the network content 112 may lack relevance to the user and may inform the user of media content 106 that the user has not yet accessed. As described previously with regard to FIG. 1, the manner in which the network content 112 is suppressed may be determined based on user preferences. For example, the entirety of the network content 112 may be suppressed from output. In other implementations, a portion of the network content 112 associated with the media content 106 may be obfuscated while other portions of the network content 112 may be used to generate output 102. In still other implementations, the network content 112 may be provided as output 102 in addition to one or more notifications indicative of the association between the network content 112 and the media content 106.

Figure 3:
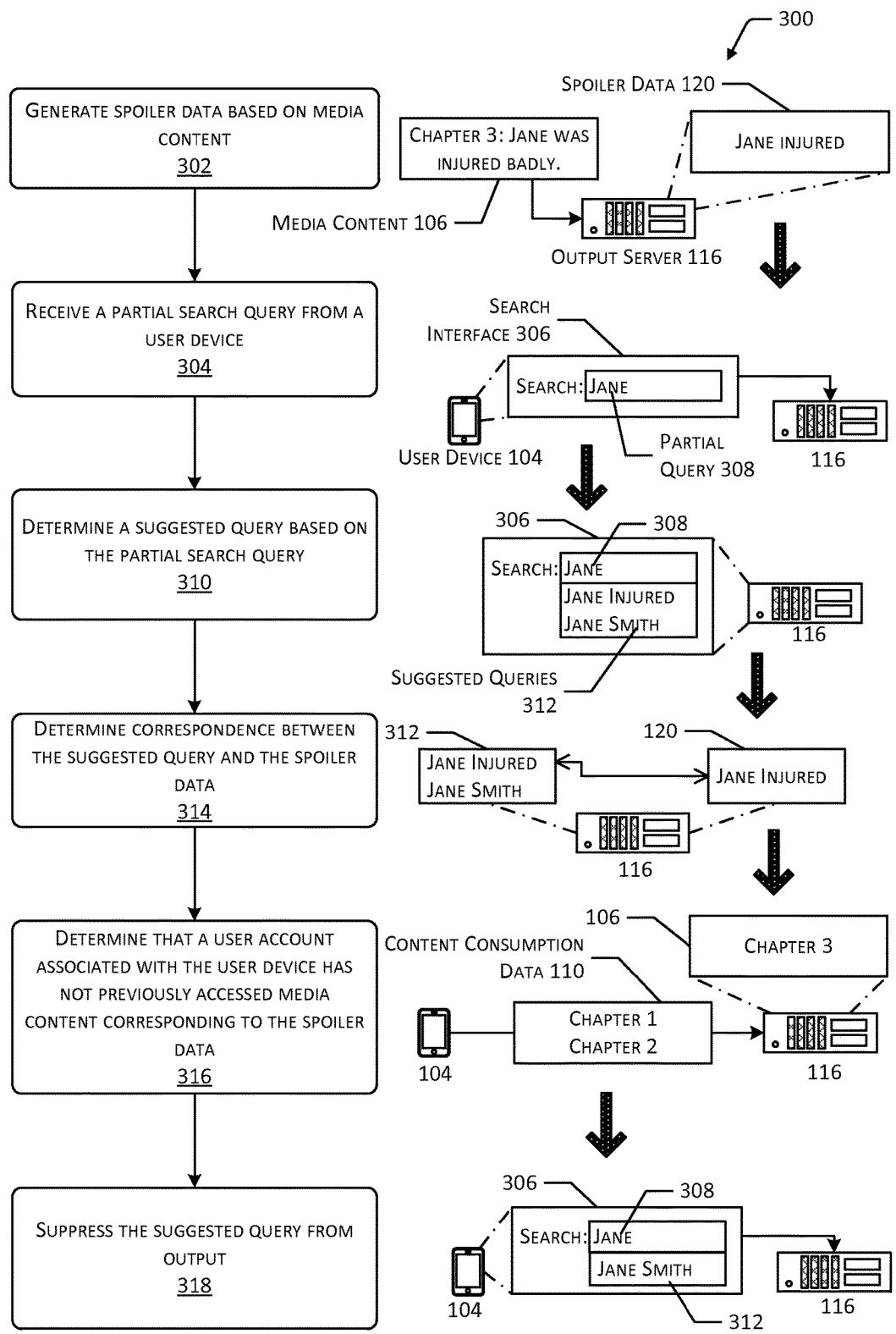
FIG. 3 depicts a scenario illustrating a method for suppressing network content from output to a user device based on spoiler data and content consumption data.

FIG. 3 depicts a scenario 300 illustrating a method for suppressing network content 112 from being provided as output 102 to a user device 104 based on spoiler data 120 and content consumption data 110. At 302, spoiler data 120 is generated based on media content 106. As described previously with regard to FIGS. 1 and 2, spoiler data 120 may be generated by analyzing or processing media content 106 using one or more of natural language processing, text recognition, speech-to-text processing, OCR, image recognition, video recognition, audio recognition, or other techniques. The spoiler data 120 may therefore correspond to portions of media content 106. For example, portions of the spoiler data 120 may be indicative of the content of one or more media objects, such as events within an e-book, movie, video, and so forth. FIG. 3 depicts media content 106 that includes an e-book. A media processing module 118 associated with the output server 116 may perform natural language processing or similar techniques on the text of the e-book to determine spoiler data 120 indicative of events that occur in the e-book. Continuing the example, a particular portion of the e-book (e.g., "Chapter 3") may include particular content (e.g., "Jane was injured badly."). The output server 116 may determine spoiler data 120 (e.g., "Jane injured") that corresponds to this portion of the media content 106.

At 304, a partial search query is received from a user device 104. For example, a user device 104 may access a search interface 306 associated with a browser or a webpage. An input device associated with the user device 104 may be used to input at least a portion of a search query (e.g., a partial query 308). For example, a user may intend to locate information regarding an individual, Jane Smith, and may provide the partial query 308 "Jane." However, due to the popularity of an e-book, in which a character named Jane is injured in chapter 3, a module associated with the search interface 306 may generate suggested search queries that relate to the content of the e-book.

At 310, one or more suggested queries 312 based on the partial search query 308 may be determined. For example, FIG. 3 depicts suggested queries 312 that include the text "Jane Injured" and "Jane Smith." The first suggested query 312, "Jane Injured", may relate to the media content 106, while the second suggested query 312, "Jane Smith", may be unrelated to the media content 106.

At 314, correspondence between one or more of the suggested queries 312 and the spoiler data 120 may be determined. For example, the first suggested query 312, "Jane Injured", may correspond to spoiler data 120 indicative of a portion of the media content 106. This correspondence may indicate that the first suggested query 312 includes information that may inform a user regarding a portion of the media content 106.

At 316, the output server 116 may determine that the user device 104 or a user account associated with the user device 104 has not previously accessed media content 106 that corresponds to the spoiler data 120. The user account may include a particular user profile associated with the user account. For example, multiple users associated with a user device 104 or user account may have associated profiles indicative of particular content consumption data 110 and configurations. In some implementations, if a user account is not determined, the output server 116 may determine whether the user device 104 has previously accessed the media content 106. In other implementations, a user device 104 may be configured to determine a physical or physiological indicator indicative of a particular user. For example, a camera associated with the user device 104 may identify physical characteristics of a user, a microphone associated with the user device 104 may identify characteristics of a user's voice, other biometric sensors may identify a user's pulse rate, and so forth.

As discussed previously with regard to FIGS. 1 and 2, content consumption data 110 indicative of the portions of media content 106 previously accessed by the user device 104 or a user account associated with the user device 104 may be determined. Correspondence between the content consumption data 110 and the media content 106 associated with the spoiler data 120 may indicate that the user device 104 has previously accessed that media content 106. If correspondence between the content consumption data 110 and the media content 106 is not determined, this may indicate that the user device 104 has not previously accessed the media content 106, and thus, that exposure to the first suggested query 312 may inform the associated user of media content 106 that the user has not previously accessed.

At 318, the suggested query 312 may be suppressed from output. For example, the first suggested query 312 may be omitted from output, and only the second suggested query 312, "Jane Smith", may be displayed. In other implementations, the first suggested query 312 may be obfuscated or notifications regarding the correspondence between the first suggested query 312 and the spoiler data 120 may be output.

Figure 4:
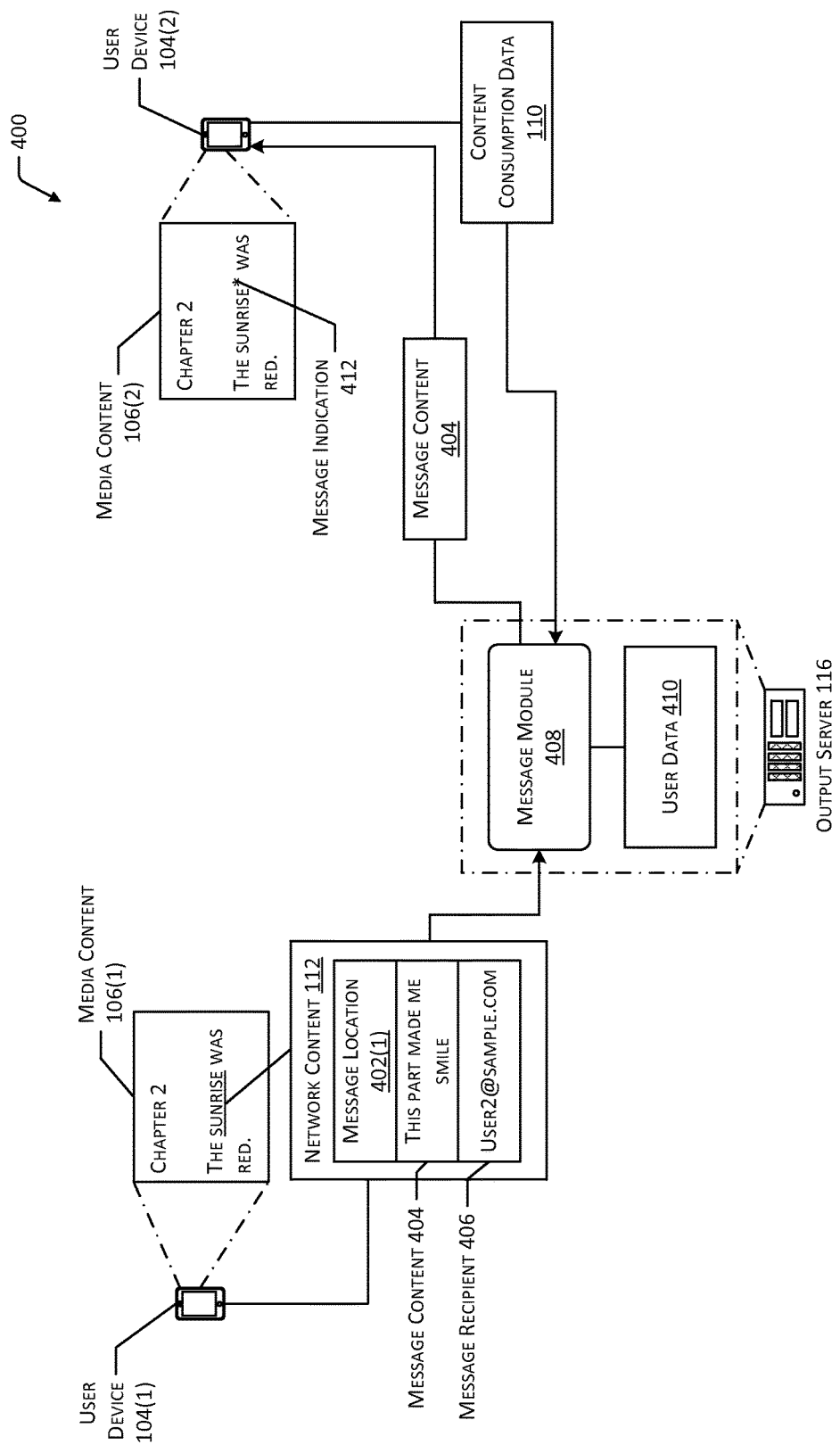
FIG. 4 depicts a system for providing messages to user devices by associating the messages with portions of media content.

FIG. 4 depicts a system 400 for providing messages to user devices 104 by associating the messages with portions of media content 106. For example, one type of network content 112 accessed by a user device 104 may include a message generated by a different user device 104. Messages may be generated for receipt by one or more particular user devices 104, groups of user devices 104, or for access by any user device that elects to receive the messages.

FIG. 4 depicts a first user device 104(1) accessing first media content 106(1). For example, the first media content 106(1) may include a particular portion of an e-book, such as a particular word, sentence, or page within a particular chapter. The first user device 104(1) may be used to generate network content 112 that includes a message associated with at least a portion of the first media content 106(1). For example, a user of the first user device 104(1) may select a particular message location 402(1) within the first media content 106(1), such as a particular word or phrase of interest to the user. The user may input message content 404 using the first user device 104(1). The message content 404 may include one or more of alphanumeric data, audio data, image data, video data, and so forth. For example, the message content 404 provided responsive to a portion of an e-book may include text or an audio recording indicating the reaction of a user to the particular portion of the e-book. The user of the first user device 104(1) may also indicate one or more message recipients 406. The message recipients 406 may indicate one or more particular users intended to receive the message content 404, such as a friend or family member associated with the user of the first user device 104(1). In other embodiments, the message recipients 406 may include a particular group of users or user devices 104, such as users associated with the user of the first user device 104(1) via a social network. In still other embodiments, the message may be indicated as a public message, and the message recipients 406 may include any users that access the message content 404.

The first user device 104(1) may provide an indication of the message location 402(1), the message content 404, and an indication of the message recipient(s) 406 to a message module 408 associated with the output server 116. The message module 408 may access user data 410 to determine one or more user devices 104 or user accounts that correspond to the message recipient(s) 406 indicated by the first user device 104(1). For example, the user data 410 may include e-mail addresses, names, telephone numbers, network addresses, and so forth, associated with one or more user devices 104 or user accounts. The message module 408 may determine correspondence between the indication(s) of the message recipient(s) 406 and the user data 410 to determine one or more particular user devices 104 or user accounts, such as a second user device 104(2). The output server 116 may provide at least a portion of the message content 404 to the second user device 104(2).

The message module 408 may determine second media content 106(2) stored in association with the second user device 104(2) to be identical to the first media content 106(1). For example, the same e-book may be stored in association with both first user device 104(1) and the second user device 104(2). The message module 408 may further determine the particular portion of the second media content 106(2) that corresponds to the message location 402(1) indicated by the first user device 104(1). The message module 408 may also determine content consumption data 110 from the second user device 104(2), indicative of the portions of the second media content 106(2) previously accessed by the second user device 104(2). Based on the content consumption data 110, the message module 408 may determine whether the second user device 104(2) has previously accessed the portion of the second media content 106(2) corresponding to the message location 402(1). If the second user device 104(2) has previously accessed that portion of the second media content 106(2), a message indication 412 indicative of the message content 404 may be output to the second user device 104(2). If the second user device 104(2) has not previously accessed that portion of the second media content 106(2), the message indication 412 may be suppressed from output until the second user device 104(2) accesses the corresponding portion of the second media content 106(2).

A user of the second user device 104(2) may access the message content 404 by selecting or otherwise indicating the message indication 412. For example, after a user of the second user device 104(2) has accessed the same portion of the second media content 106(2) as the user of the first user device 104(1), the second user device 104(2) may output message content 404 indicative of the first user's reactions to the first media content 106(1), which corresponds to or is identical to the second media content 106(2). In some implementations, the message content 404 may be output to the second user device 104(2) automatically, without user input selecting the message indication 412. In other implementations, a user may provide user preferences. The user preferences may indicate one or more types of message content 404 or one or more message sources (e.g., user devices 104 or user accounts that generate the message content 404) that may be output automatically. The user preferences may also indicate one or more types of message content 404 or one or more message sources that may be suppressed from output. The user preferences may further indicate one or more types of message content 404 or one or more message sources that may cause the message content 404 to be output only after receiving user input selecting a corresponding message indication 412.

In some implementations, the message indication 412 may indicate one or more of the type of the corresponding message content 404 or the source of the message content 404. For example, the message indication 412 may include a particular color or shape representing a particular user. As another example, the message indication 412 may include a first color or shape to indicate that the message content 404 was received from a user's social network, a second color or shape to indicate that the message content 404 corresponds to a public message from a celebrity, and a third color or shape to indicate that the message content 404 corresponds to a particular friend or family member. A second user device 104(2) may provide user preferences selecting particular features of the message indication 412 to correspond to particular types of message content 404 or message sources. In some implementations, the message indication 412 may include alphanumeric data indicative of one or more of the message content 404 or the source of the message content 404. For example, the message indication 412 may include an address or other identifier associated with a user account that generated the message content 404. As another example, the message indication 412 may include text indicative of at least a portion of the message content 404 or text indicating a type or category corresponding to the message content 404.

In some implementations, in lieu of or in addition to the message location 402(1), a message may include time data indicative of a length of time. For example, a first user may generate message content 404 to be output to a user device 104 associated with second user after the second user has accessed particular media content 106 for a length of time. In other implementations, in lieu of or in addition to the message location 402(1), a message may include location data indicative of a particular location. For example, a first user may generate message content 404 to be output to a user device 104 associated with second user after the second user travels to a particular physical location. Continuing the example, the first user may record an audio message to be output when the second user reaches his or her home, a national landmark, a location where an event is occurring, and so forth.

Figure 5:
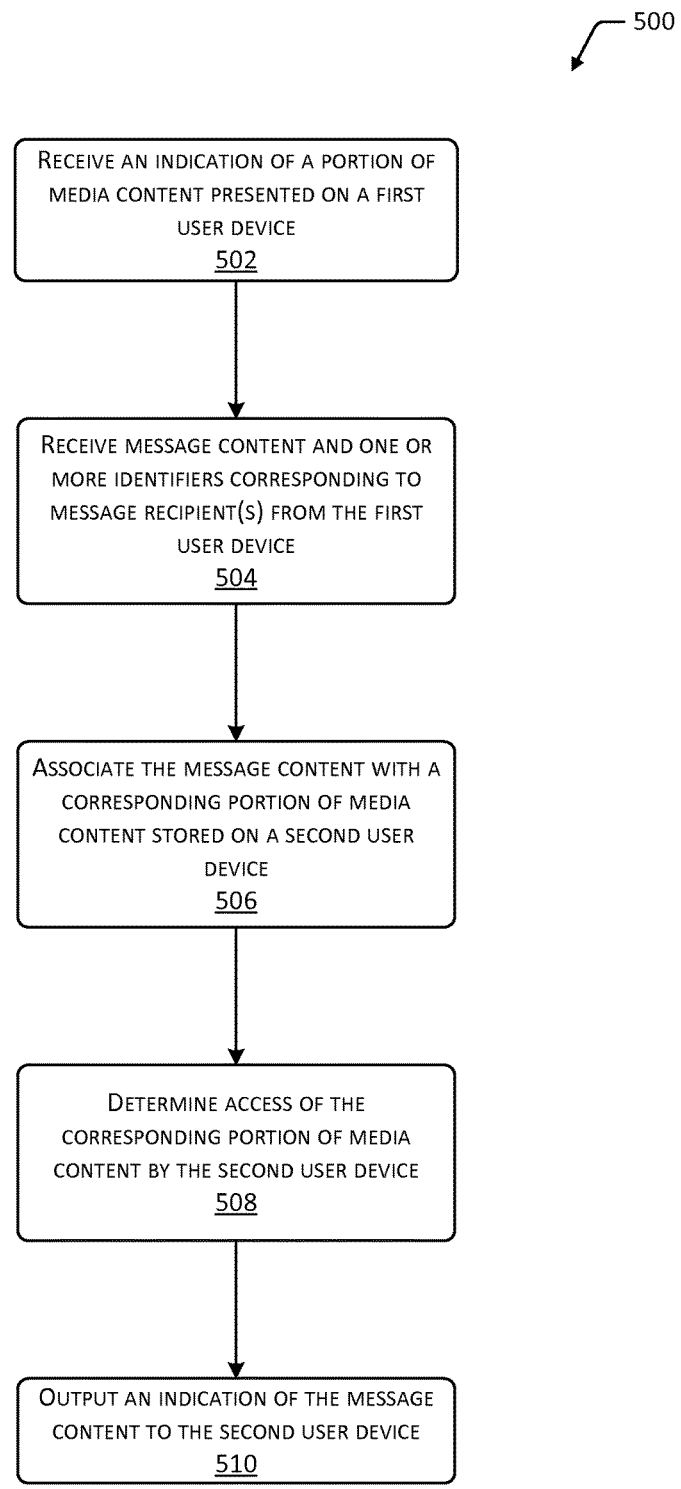
FIG. 5 is a flow diagram illustrating a method for providing message content to user devices by associating the message content with portions of media content.

FIG. 5 is a flow diagram 500 illustrating a method for providing message content 404 to user devices 104 by associating the message content 404 with portions of media content 106. Block 502 receives an indication of a portion of media content 106 presented on a first user device 104(1). Media content 106 may include alphanumeric data, video data, data, and so forth. For example, media content may include an e-book, a movie, or a song. A particular portion of media content 106 may include a chapter, page, sentence, phrase, word, or letter of an e-book, a length of time within a movie or song, and so forth. For example, a user of a user device 104 may indicate a particular word within an e-book using a touchscreen, a mouse device, or another type of input device. As another example, a user of a user device 104 may indicate a particular length of time within a movie using a touchscreen, a mouse device, a remote control associated with a television, and so forth. Continuing the example, a user watching a video file may indicate a particular portion of the video by interacting with a scroll bar or similar interface, pausing or resuming video content, recording or capturing video content, and so forth.

Block 504 receives message content 404 and one or more identifiers corresponding to message recipients 406 from the first user device 104(1). For example, a user interface may be provided to the first user device 104(1) for receiving message content 404. Continuing the example, the user interface may include a web page provided to the first user device 104(1) for presentation. In other implementations, the first user device 104(1) may be provided with HyperText Markup Language (HTML) or other types of instructions to cause presentation of a user interface on the first user device 104(1). The message content 404 may include one or more of alphanumeric data, audio data, image data, or video data.

For example, a user may provide text commenting on a portion of an e-book or a particular image using a touch-screen interface or a keyboard. As another example, a user may provide an image or video generated using a camera associated with the first user device 104(1). As yet another example, a user may provide an audio recording using a microphone associated with the first user device 104(1). A user of the first user device 104(1) may similarly provide an indication of the message recipient(s) 406 using a touch-screen, keyboard, mouse device, microphone, or other type of input device. For example, one or more identifiers associated with particular message recipients 406 or groups of message recipients 406 (e.g., members of a user's social network) may be accessed via a drop-down or pop-up menu, or other type of user interface. In some implementations, a user may designate a message as a public message that may be accessed by any user device 104 that elects to access the message content 404. In some implementations, a user may designate a message as an anonymous message that will not be associated with an identification of the user generating the message content 404.

Block 506 associates the message content 404 with a corresponding portion of media content 106 stored on a second user device 104(2). For example, the second user device 104(2) and the first user device 104(1) may each have a copy of the same media content 106 stored in association therewith. The output server 116 may provide the message content 404 received from the first user device 104(1) to the second user device 104(2) and store the message content 404 in association with the same portion of the media content 106 indicated by the first user device 104(1). Continuing the example, a first user may indicate a portion of a movie (e.g., from 37 minutes and 22 seconds into the movie to 38 minutes and 48 seconds into the movie) and generate an audio message indicative of the user's reactions to that portion of the movie. The output server 116 may store the audio message generated by the first user device 104 (1) in association with the same portion of the same movie on a second user device 104(2) associated with the second user. Storage of the message content 404 in association with the second user device 104(2) may enable the second user device 104(2) to access the message content 404 in the absence of a network connection.

Block 508 determines access of the corresponding portion of the media content 106 by the second user device 104(2). In some implementations, the access of the corresponding portion of the media content 106 may include a current access of the media content 106 by the second user device 104(2). For example, message content 404 may be stored in association with a specific passage within chapter 4 of an e-book. Block 508 may determine access to a page of the e-book containing that specific passage. In other implementations, content consumption data 110 may be determined from the second user device 104(2). The content consumption data 110 may indicate the portions of media content 106 previously accessed by the second user device 104(2). The content consumption data 110 may indicate entire media objects, such as e-books or movies, that have been accessed in their entirety by the second user device 104(2). The content consumption data 110 may further include portions of media content 106. For example, if a user has accessed a first portion of an e-book and inserted an electronic bookmark, the content consumption data 110 may indicate the portions of the e-book that have been previously accessed and the position of the bookmark. In some implementations, the portions of a media content 106 indicated by the content consumption data 110 may be discontinuous. For example, a user may access the chapters of an e-book in a non-consecutive order.

If block 508 determines that the second user device 104(2) has accessed the corresponding portion of the media content 106, block 510 outputs an indication of the message content 404 to the second user device 104(2). In some implementations, the message content 404 may be output automatically to the second user device 104(2). In other implementations, a message indication 412 may be output to the second user device 104(2) in a location proximate to the portion of the media content 106 associated with the message content 404. Receipt by the second user device 104(2) of user input selecting or indicating the message indication 412 may cause the message content 404 to be output. In some implementations, the message indication 412 may include a notification to the second user device 104(2) that a message has been received. For example, content consumption data 110 associated with a first user device 104(1) may indicate that the first user device 104(1) has previously accessed the first four chapters of an e-book and has placed an electronic bookmark at the beginning of the fifth chapter. A second user device 104(2) may subsequently generate message content 404 associated with the third chapter of the e-book. When the message content 404 is provided to the first user device 104(1), the first user device 104(1) may output a notification indicating that message content 404 associated with a previously-accessed portion of the media content 106 has been received.

In some implementations, multiple messages may be associated with a particular message location 402 within media content 106. The message content 404 may be output individually or simultaneously. For example, multiple users watching a movie or an episode of a television series may record message content 404 that includes an audible response to a particular portion of the movie or episode. A receiving user may access the media content 106 associated with the messages. When the user device 104 associated with the receiving user reaches the particular portion of the media content 106 having the associated message content 404, each of the audio reactions may be output simultaneously, simulating the presence of multiple other users reacting to the media content 106. In other implementations, a receiving user may provide user input indicating a preference that each message content 404 may be output individually.

If the content consumption data 110 indicates that the second user device 104(2) has not previously accessed the corresponding portion of the media content 106, and a current access of the portion of the media content 106 by the second user device 104(2) is not determined, the message content 404 may not be presented to the second user device 104(2). In some implementations, the message content 404 may be stored in association with the second user device 104(2), but an indication of the message content 404, or the message content 404 itself, may only be presented when the second user device 104(2) is used to access the corresponding portion of the media content 106. In other implementations, the message content 404 may be stored remote from the second user device 104(2) and only retrieved when the second user device 104(2) is used to access the corresponding portion of the media content 106. In still other implementations, output of the message content 404 to the second user device 104(2) may be suppressed. For example, content consumption data 110 associated with the second user device 104(2) may indicate that the second user device 104(2) has previously accessed the first two chapters of an e-book. The first user device 104(1) may subsequently generate message content 404 associated with the third chapter of the e-book. While the message content 404 generated by the first user device 104(1) may be stored in association with the media content 106 on the second user device 104(2), the second user device 104(2) may not output a notification or indication of the message content 404 when the message content 404 is received. Instead, the second user device 104(2) may output the message content 404 or a message indication 412 at the time when the second user device 104(2) accesses the corresponding portion of the media content 106. Suppression of the message content 404 until the corresponding media content 106 is accessed may prevent the message content 404 from spoiling the media content 106 while also ensuring that the message content 404 is relevant at the time when it is output.

Figure 6:
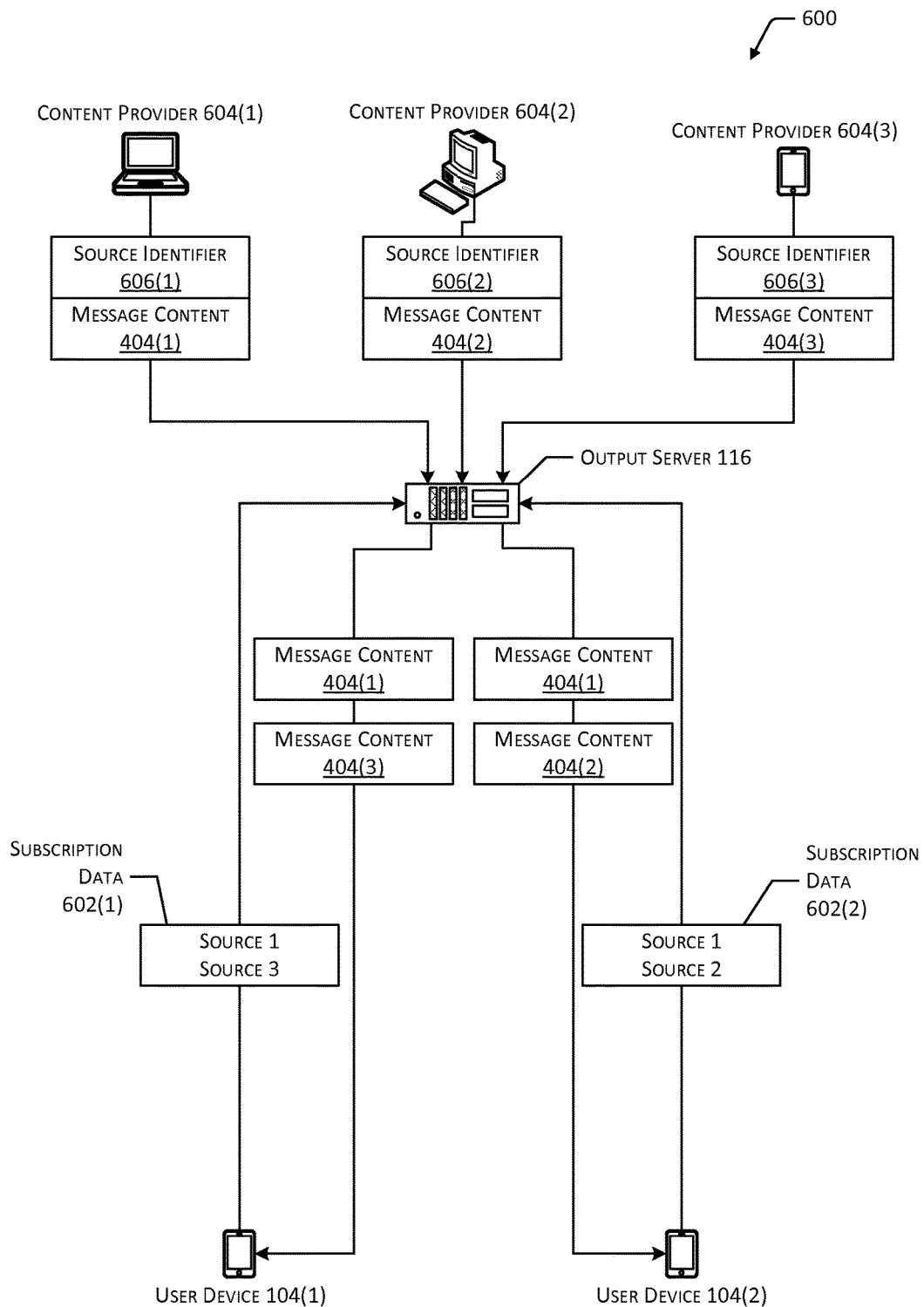
FIG. 6 depicts a system for providing message content to user devices based on subscription data associated with the user devices.

FIG. 6 depicts a system 600 for providing message content 404 to user devices 104 based on subscription data 602 associated with the user devices 104. Message content 404 may be generated by one or more content providers 604. In some implementations, content providers 604 may include user accounts or user devices 104, as described with regard to FIGS. 4 and 5. For example, a user may generate message content 404 for receipt by one or more particular users, groups of users, or for any user that elects to access the message content 404. In other implementations, content providers 604 may include public figures, such as authors, actors, television personalities, politicians, and so forth. In still other implementations, content providers 604 may include companies or other business entities, producers, providers, or distributors of media content 106, and so forth. The content providers 604 may include one or more computing devices associated therewith. The computing devices may be of any type including, but not limited, to those described with regard to the user devices 104.

A first content provider 604(1) may generate first message content 404(1) associated with a first source identifier 606(1). The first source identifier 606(1) may include data indicative of the first content provider 604(1). For example, the first source identifier 606(1) may include a user name, network address, e-mail address, other contact information, other identifying information, and so forth. A second content provider 604(2) may generate second message content 404(2) associated with a second source identifier 606(2). A third content provider 604(3) may generate third message content 404(3) associated with a third source identifier 606(3). As described previously with regard to FIGS. 4 and 5, the message content 404 provided by each content provider 604 may be associated with a particular portion of media content 106. For example, the first content provider 604(1) may include an author of an e-book, and the first message content 404(1) may include text describing a writing technique used at a particular portion of the e-book. The second content provider 604(2) may include a television celebrity sponsoring the e-book, and the second message content 404(2) may include text comments indicating the emotional reaction of the celebrity to a particular portion of the e-book. The third content provider 604(3) may include an individual user that purchased the e-book, and the third message content 404(3) may include a personal message to the user's children regarding the importance of a particular portion of the e-book.

In some implementations, content providers 604 may provide indications of one or more message recipients 406 that may receive message content 404. However, in other implementations, a content provider 604 may designate a message as a public message, accessible to any user that elects to access the message content 404. Subscription data 602, indicative of particular content providers 604 or types of message content 404, may be determined from one or more user devices 104. For example, a user associated with a first user device 104(1) may elect to receive message content 404 from the first content provider 604(1) and the third content provider 604(3), but not the second content provider 604(2). A user associated with a second user device 104(2) may elect to receive message content 404 from the first content provider 604(1) and the second content provider 604(2), but not the third content provider 604(3).

The output processing module 122 or another module associated with the output server 116 may determine the subscription data 602 from one or more user devices 104. The output processing module 122, or another module, may also determine correspondence between the subscription data 602 and the source identifier(s) 606 associated with message content 404. Based on the correspondence between the subscription data 602 for a particular user device 104 and the source identifier 606 for particular message content 404, that message content 404 may be provided to the user device 104. The message content 404 may be associated with the particular portion of media content 106 stored on the user device 104, as described previously with regard to FIG. 4. If content consumption data 110 associated with the user device 104 indicates that the user device 104 has previously accessed that particular portion of the media content 106, an indication of the message content 404 may be output to the user device 104. If the content consumption data 110 does not indicate that the user device 104 has accessed the particular portion of the media content 106, no indication of the message content 404 may be output. If there is a lack of correspondence between the subscription data 602 for a particular user device 104 and the source identifier 606 for particular message content 404, the particular message content 404 may not be provided to the user device 104.

For example, FIG. 6 depicts the first message content 404(1) associated with the first content provider 604(1) and the third message content 404(3) associated with the third content provider 604(3) being provided to the first user device 104(1) by the output server 116, based on the first subscription data 602(1) associated with the first user device 104(1). The output server 116 is also shown providing the first message content 404(1) associated with the first content provider 604(1) and the second message content 404(2) associated with the second content provider 604(2) to the second user device 104(2), based on the second subscription data 602(2) associated with the second user device 104(2). The message content 404 received by each user device 104 may be associated with particular portions of media content 106. The message content 404 may be output or suppressed based on the content consumption data 110 associated with each user device 104, as described previously with regard to FIGS. 4 and 5.

While FIG. 6 depicts the subscription data 602 including an indication of particular content providers 604, in other implementations, the subscription data 602 may include social network data indicative of a particular group of content providers 604 connected to a particular user account within a social graph. For example, a first user may elect to receive message content 404 from other users connected to the first user within a social graph. Correspondence between first social network data associated with a first user device 104(1) or first user account and second social network data associated with a second user device 104(2) or second user account may be determined. Based on this correspondence, message content 404 generated by the second user device 104(2) or second user account may be output to the first user device 104(1). In still other implementations, the subscription data 602 may indicate particular message content 404 or other types of data. For example, subscription data 602 may include an indication of a particular type or category corresponding to message content 404. Continuing the example, a type or category of message content 404 may include user-submitted reviews, summaries of media content 106, soundtracks, video clips, and so forth. Message content 404 that corresponds to the particular type or category may be provided to the associated user device 104 independent of the content provider 604 that generated the message content 404. In other implementations, the subscription data 602 may indicate message content 404 having particular words, terms, images, and so forth. For example, a user may elect to receive messages associated with certain topics based on the content (e.g., alphanumeric data, audio data, image data, etc.) within the messages. As another example, subscription data 602 may include an indication of particular media content 106. For example, a user may elect to receive message content 404 associated with a particular television series, while refraining from receiving message content 404 associated with other media content 106, independent of the content provider 604 that generated the message content 404.

As yet another example, subscription data 602 may include an indication of review or rating data associated with particular media content 106, message content 404, or content providers 604. For example, user input may be received with regard to particular media content 106, particular messages, or particular content providers 604. The user input may include a qualitative or quantitative rating, a positive or negative review, and so forth. Based on the user input, rating data associated with one or more media content 106, message content 404, or content providers 604 may be determined. For example, the rating data may include an average or aggregate rating associated with particular media content 106, message content 404, or content providers 604. A user may elect to receive message content 404 associated with a selected threshold rating value. For example, the subscription data 602 may indicate that a user has elected to receive all message content 404 having associated rating data that exceeds a threshold rating value, a selected portion of message content 404, and so forth. Selected portions of message content 404 may include fixed quantities of message content 404, such as the 20 items of message content 404 having the highest associated rating values. In other implementations, portions of message content 404 may include a percentage of the message content 404, such as ten percent of the message content 404 that has the highest associated rating values. As another example, a user may elect to receive message content 404 produced by content providers 604 having rating values in excess of a threshold value, a selected portion of the message content 404, or message content 404 from a selected portion of the content providers 604. As yet another example, a user may elect to receive message content 404 associated with media content 106 having rating values in excess of a threshold value, a selected portion of the message content 404, or message content 404 associated with a selected portion of the media content 106.

The subscription data 602 may include any combination of filters or criteria. For example, a user may select particular media content 106, particular content providers 604, particular types of message content 404, and particular rating data. Based on this subscription data 602, message content 404 corresponding to each of the selected filters or criteria may be provided to the associated user device 104. In other implementations, the subscription data 602 may include filter data. Filter data may indicate one or more of particular media content 106, particular content providers 604, particular types of message content 404, or particular rating data. If correspondence between the filter data and the media content 106, content provider 604, rating data, or type or category associated with message content 404 is determined, that particular message content 404 may be suppressed from output to the associated user device 104.

Figure 7:
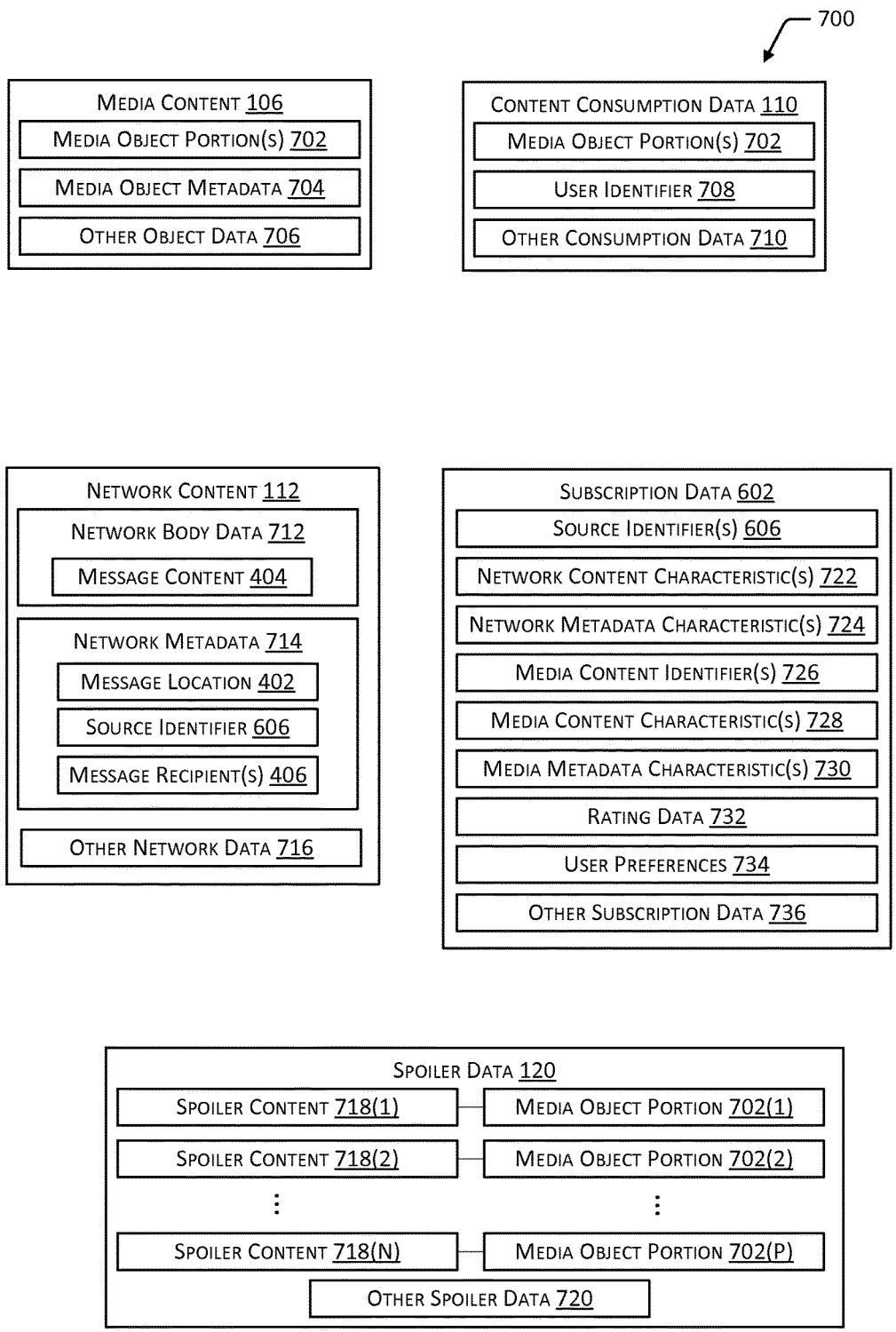
FIG. 7 is a block diagram depicting example media content, content consumption data, network content, subscription data, and spoiler data.

FIG. 7 is a block diagram 700 depicting example media content 106, content consumption data 110, network content 112, spoiler data 120, and subscription data 602. Media content 106 may include any manner of alphanumeric data, audio data, image data, video data, metadata, and so forth. For example, media content 106 may include one or more media objects, such as e-books, video files, audio files, and so forth. The media content 106 may include one or more media object portions 702. A media object portion 702 may include an entire media object or part of a media object. For example, a media object may include an e-book, while a portion of that media object may include a chapter, a page, a paragraph, a sentence, a word, or a letter within the e-book. Continuing the example, as a user device 104 access particular media object portions 702, content consumption data 110 associated with that user device 104 may reflect the access of those particular media object portions 702. Additionally, as described previously with regard to FIGS. 5 and 6, a user device 104 may select a particular media object portion 702 as a message location 402 with which message content 404 may be associated.

Media content 106 may also include media object metadata 704. Media object metadata 704 may indicate a type or category associated with the media content 106, one or more flags or labels associated with the media content 106, and so forth. Media object metadata 704 may also indicate a source of the media content 106, an author of the media content 106, and so forth. The media object metadata 704 may be used to facilitate filtering of media content 106. For example, subscription data 602 may include one or more particular types or categories associated with media content 106 that may be determined from the media object metadata 704. Types or categories of media content 106 may include books, videos, movies, comics, songs, soundtracks, television episodes, and so forth. Types or categories of media content 106 may also include sub-categories, such as action movies, romance novels, classical music, and so forth.

Other object data 706 may include ratings or reviews associated with media content 106, an access history associated with the media content 106, an indication of related media content 106, and so forth. Other object data 706 may also include identifiers associated with media content 106, such as file names, titles, file locations or addresses, or other unique identifiers.

Content consumption data 110 may indicate one or more media content portions 702 previously accessed by a user device 104, a user account, a group of user devices 104 or user accounts, and so forth. For example, content consumption data 110 may include an indication of one or more media object portions 702 previously accessed by one or more particular user devices 104 associated with the content consumption data 110. The content consumption data 110 may also include one or more user identifiers 708 associated with the user account, user device 104, or group of user accounts or user devices 104 that accessed the media object portions 702. In some implementations, content consumption data 110 may be determined based at least partly on a browsing history or a purchase history associated with a user device 104. In other implementations, content consumption data 110 may be determined based on access logs associated with a user device 104. Other consumption data 710 may include the position of electronic bookmarks within an e-book or the position within a video file or audio file during which playback was paused. Other consumption data 710 may include data indicative of other types of content accessed by the user device 104. Other consumption data 710 may further include data indicative of media content 106 stored in association with a user device 104, but not necessarily accessed by the user device 104, such as a movie that has been purchased and downloaded to the user device 104, but not yet output.

Network content 112 may include any manner of data accessible to a user device 104. For example, network content 112 may include one or more of alphanumeric data, audio data, video data, or image data accessed by a user device 104 over one or more networks. Continuing the example, network content 112 may include data presented on a webpage, a search interface, a browser interface, and so forth. In other implementations, network content 112 may include data accessible to a user device 104 in the absence of a network, such as content stored in data storage accessible to the user device 104. For example, a user device 104 may synchronize and store network content 112 for use in the absence of a network. The network content 112 may include network body data 712, which may include the alphanumeric data, audio data, video data, or image data associated with the purpose of the network content 112 (e.g., the payload, cargo data, etc., associated with the network content 112). For example, the network body data 712 may include text associated with a review of an e-book, video data associated with a summary of a television episode, and so forth. The network content 112 may also include network metadata 714, which may include one or more types or categories associated with the network content 112, one or more flags or labels associated with the network content 112, and so forth. Other network data 716 may include access logs associated with the network content 112, security features associated with the network content 112, an indication of related network content 112, an indication of related media content 106, and so forth. In some implementations, other network data 716 may include an indication of a location associated with the network content 112.

One example of network content 112 may include messages generated by a first user for output to one or more other users. For example, the network body data 712 may include message content 404, such as text indicative of a reader's reaction to a portion of an e-book or recorded audio data indicative of a reader's reaction to a portion of a movie.

The network metadata 714 may include a message location 402 indicative of one or more media object portions 702. For example, a user generating a message may select a particular portion of media content 106 using an input device and generate message content 404 to be associated with that particular portion of the media content 106. The network metadata 714 may further include a source identifier 606 indicative of the user account, user device 104, or group of user accounts or user devices 104 that generated the message content 404. In some implementations, a user generating message content 404 may provide the message anonymously, in the absence of a source identifier 606. In other implementations, a message provided anonymously may be accompanied by a source identifier 606 indicating that the message is anonymous. The network metadata 714 may also include an indication of one or more message recipients 406. The message recipients 406 may include particular users or groups of users (e.g., other users connected, within a social graph, to the user that generated the message content 404). In some implementations, a message may be designated as a public message, accessible to all message recipients 406 that elect to access the message content 404.

Spoiler data 120 may include alphanumeric data, audio data, video data, image data, and so forth, indicative of media object portions 702. For example, as described previously with regard to FIG. 1, spoiler data 120 may be generated by performing any manner of text, video, audio, or image recognition, OCR, natural language processing, or other processing techniques on media content 106. Processing of the media content 106 may yield spoiler content 718, which may include alphanumeric data, audio data, video data, or image data indicative of the particular content of one or more media object portions 702. The spoiler content 718 may be stored in association with an indication of the media object portion 702 from which the spoiler content 718 was determined.

For example, a first spoiler content 718(1) may be stored in association with a first media object portion 702(1), a second spoiler content 718(2) may be stored in association with a second media object portion 702(2). Any number of additional spoiler content 718(N) may be stored in association with additional media object portions 702(P). While FIG. 7 depicts a one-to-one correspondence between spoiler content 718 and media object portions 702, in some implementations, multiple items of spoiler content 718 may correspond to a single media object portion 702, or a single item of spoiler content 718 may correspond to multiple media object portions 702.

Other spoiler data 720 may include spoiler content 718 determined from network content 112. Other spoiler data 720 may also include indications of media object metadata 704 corresponding to the spoiler content 718. Other spoiler data 720 may further include an access history indicating the instances or frequency at which correspondence between network content 112 and particular spoiler content 718 was determined.

Subscription data 602 may include data input by a user or determined from a user device 104, indicative of content that may be output to a user device 104 or filtered from output to the user device 104. For example, subscription data 602 may include one or more source identifiers 606. Source identifiers 606 may correspond to content providers 604, which may include user devices 104, user accounts, or other generators or distributors of message content 404 or other network content 112. Subscription data 602 indicative of source identifiers 606 may indicate particular content providers 604 of interest to a user. Correspondence between the source identifier 606 of network content 112 generated by the particular content providers 604 and the subscription data 602 may result in the output of the network content 112 to the associated user device 104. In other implementations, the subscription data 602 may include filter data relating to one or more source identifiers 606. For example, a user may select one or more particular content providers 604 to be suppressed from output. Correspondence between the source identifier 606 of network content 112 generated by the particular content providers 604 and the filter data may result in the suppression of the network content 112.

The subscription data 602 may also include one or more network content characteristics 722. Network content characteristics 722 may include information determined from the network body data 712. For example, one or more of natural language processing, OCR, text recognition, audio recognition, video recognition, speech-to-text processing, or other techniques may be performed on the network body data 712 to determine characteristics of the network content 112. Continuing the example, network content characteristics 722 may include particular words, phrases, images, and so forth, within a webpage may be determined by analyzing the network body data 712. Correspondence between the network body data 712 of network content 112 and the network content characteristics 722 of the subscription data 602 may result in the output of the network content 112 to the associated user device 104. For example, a user may elect that network content 112 containing a particular term or set of terms is output to the user device 104. In other implementations, correspondence between the network body data 712 of network content 112 and the network content characteristics 722 of the subscription data 602 may result in the suppression of the network content 112. For example, a user may elect to filter network content 112 containing particular terms, such as inappropriate language or content inappropriate for minors.

The subscription data 602 may also include network metadata characteristics 724. Network metadata characteristics 724 may include information determined from network metadata 714. For example, the network metadata 714 may indicate a type, category, flag, label, or other characteristic or feature associated with network content 112. Network metadata 714 may also indicate a location within media content 106 with which the network content 112 is associated (e.g., a message location 402) or one or more recipients associated with the network content 112 (e.g., message recipients 406). Correspondence between the network metadata 714 of the network content 112 and the network metadata characteristics 724 of the subscription data 602 may result in the output of the network content 112 to the associated user device 104. For example, a user may elect that network content 112 associated with a particular type or category be output to the user device 104. In other implementations, correspondence between the network metadata 714 and the subscription data 602 may result in suppression of the network content 112. For example, a user may elect to filter network content 112 corresponding to one or more particular categories.

The subscription data 602 may include one or more media content identifiers 726. Media content identifiers 726 may include data indicative of media content 106. For example, a media content identifier 726 may include a title, a file name, a file location or address, an indication of a label or other metadata associated with particular media content 106, or another type of unique identifier (e.g., alphanumeric data) associated with particular media content 106. A user may select media content identifiers 726 associated with particular media content 106 of interest or disinterest to the user. As described previously, network content 112 may be determined to be associated with particular media content 106. Correspondence between the media content 106 with which network content 112 is associated and the media content identifiers 726 of the subscription data 602 may result in output or suppression of the network content 112.

The subscription data 602 may further include one or more media content characteristics 728. Media content characteristics 728 may include information determined from media content 106. For example, one or more of natural language processing, OCR, text recognition, audio recognition, video recognition, speech-to-text processing, or other techniques may be performed on the media content 106 to determine the media content characteristics 728. Continuing the example, the media content characteristics 728 may indicate particular words or phrases found in an e-book or images found in a movie. Accessed network content 112 may be determined to be associated with particular media content 106. Correspondence between the media content 106 associated with the network content 112 and the media content characteristics 728 of the subscription data 602 may result in the output of the network content 112 to the associated user device 104. For example, a user may elect that network content 112 that relates to media content 106 containing a particular term or set of terms is output to the user device 104. In other implementations, correspondence between the media content 106 associated with the network content 112 and the media content characteristics 728 of the subscription data 602 may result in the suppression of the network content 112. For example, a user may elect to filter network content 112 that is associated with media content 106 containing particular terms or images, such as graphic images.

The subscription data 602 may also contain media metadata characteristics 730. Media metadata characteristics 730 may include information determined from media object metadata 704. For example, media object metadata 704 may indicate a type, category, flag, label, or other characteristic or feature associated with media content 106. Accessed network content 112 may be determined to be associated with particular media content 106. Correspondence between the media object metadata 704 of the particular media content 106 and the media metadata characteristics 730 of the subscription data 602 may result in the output of the network content 112 to the associated user device 104. For example, a user may elect that network content 112 associated with media objects of a particular type or category be output to the user device 104. In other implementations, correspondence between the media object metadata 704 and the subscription data 602 may result in suppression of the network content 112. For example, a user may elect to filter network content 112 corresponding to one or more particular categories of disinterest to the user.

The subscription data 602 may additionally include rating data 732. Rating data 732 may include a qualitative or quantitative rating value based at least partly on user input. For example, users may provide user input indicative of a rating value, a positive or negative review, and so forth. The rating data 732 may be associated with media content 106, media object portions 702, media object metadata 704 (e.g., particular categories of media content 106), network content 112, network metadata 714 (e.g., particular categories of network content 112), or content providers 604 indicated by source identifiers 606. For example, a user may elect to suppress output of network content 112 provided by content providers 604 having associated rating data 732 less than a threshold rating value. As another example, a user may elect to receive output 102 associated solely with network content 112 that receives a rating in excess of a threshold rating value. In some implementations, a user may elect to receive output 102 associated with a fixed quantity of content, such as 20 items of network content 112, associated with a particular e-book, having the greatest rating values. In other implementations, a user may elect to receive output associated with a particular percentage of content, such as the ten percent of the network content 112 having the greatest rating values. Similarly, a user may elect to receive or filter output associated with media content 106 having associated rating data 732 in excess of or below a threshold rating value.

Subscription data 602 may also include user preferences 734. User preferences 734 may include user input regarding features of user interfaces. User preferences 734 may also include user input regarding threshold rating values. In some implementations, user preferences 734 may include user input indicative of a manner in which portions of network content 112 may be suppressed or obfuscated. For example, the user preferences 734 may indicate that a first type of network content 112 may be output to the user device 104 independent of correspondence between the network content 112 and spoiler data 120. Continuing the example, the first type of network content 112 may be associated with media content 106 that is not of interest to the user or a type of media content 106 for which enjoyment would not be hindered by access to the network content 112. A second type of network content 112 may be output to the user device 104 accompanied by a notification indicative of the correspondence between the network content 112 and the spoiler data 120. For example, a webpage may be provided with a notification, which warns a user of the presence of network content 112 associated with particular media content 106. In some implementations, user input selecting or acknowledging the notification may be received prior to outputting the network content 112. In other implementations, the network content 112 may be output with the notification proximate thereto. A third type of network content 112 may be obfuscated prior to outputting the network content 112 to the user device 104. For example, text associated with the network content 112 may be blurred, modified, or obscured with overlaying text or images. As another example, sounds associated with the network content 112 may be softened, modified, or obscured using additional sounds. As yet another example, images associated with the network content may be blurred, colored differently, modified, and so forth. A fourth type of network content 112 may be suppressed from output altogether. In some implementations, a notification of suppression of the network content 112 may be provided to the user device 104, and user input may be received indicating a request to output the network content 112. In other implementations, network content 112 may be suppressed without providing a notification to the user device 104.

User preferences 734 may also include an indication regarding network content 112 that may be output to a user device 104 automatically. User preferences 734 may also include an indication regarding network content 112 that may be suppressed from output. User preferences 734 may further include an indication regarding network content 112 that may be output to a user device 104 after receiving user input selecting or indicating the network content 112. For example, a user may provide user preferences 734 selecting particular users or content providers 604 from which message content 404 may be output automatically when a user device 104 accesses the associated message location 402. Other user preferences 734 may indicate content providers 604 for which message content 404 may be indicated using a message indication 412. The message content 404 may be output responsive to receipt of user input selecting the message indication 412. Continuing the example, the user preferences 734 may also indicate content providers 604 for which message content 404 will be suppressed from output.

Other subscription data 736 may include indications of spoiler data 120. For example, a user may indicate that particular spoiler content 718 is not of interest and that network content 112 corresponding to the particular spoiler content 718 may be output. Other subscription data 736 may include indications of particular modules or interfaces associated with the user device 104. For example, a user may select to suppress or permit particular output 102 when using a browser interface or a search interface, but to refrain from suppressing or permitting the output 102 when using other modules associated with the user device 104. Other subscription data 736 may also include user data 410 indicative of a user account or user device 104 associated with the subscription data 602.

Figure 8:
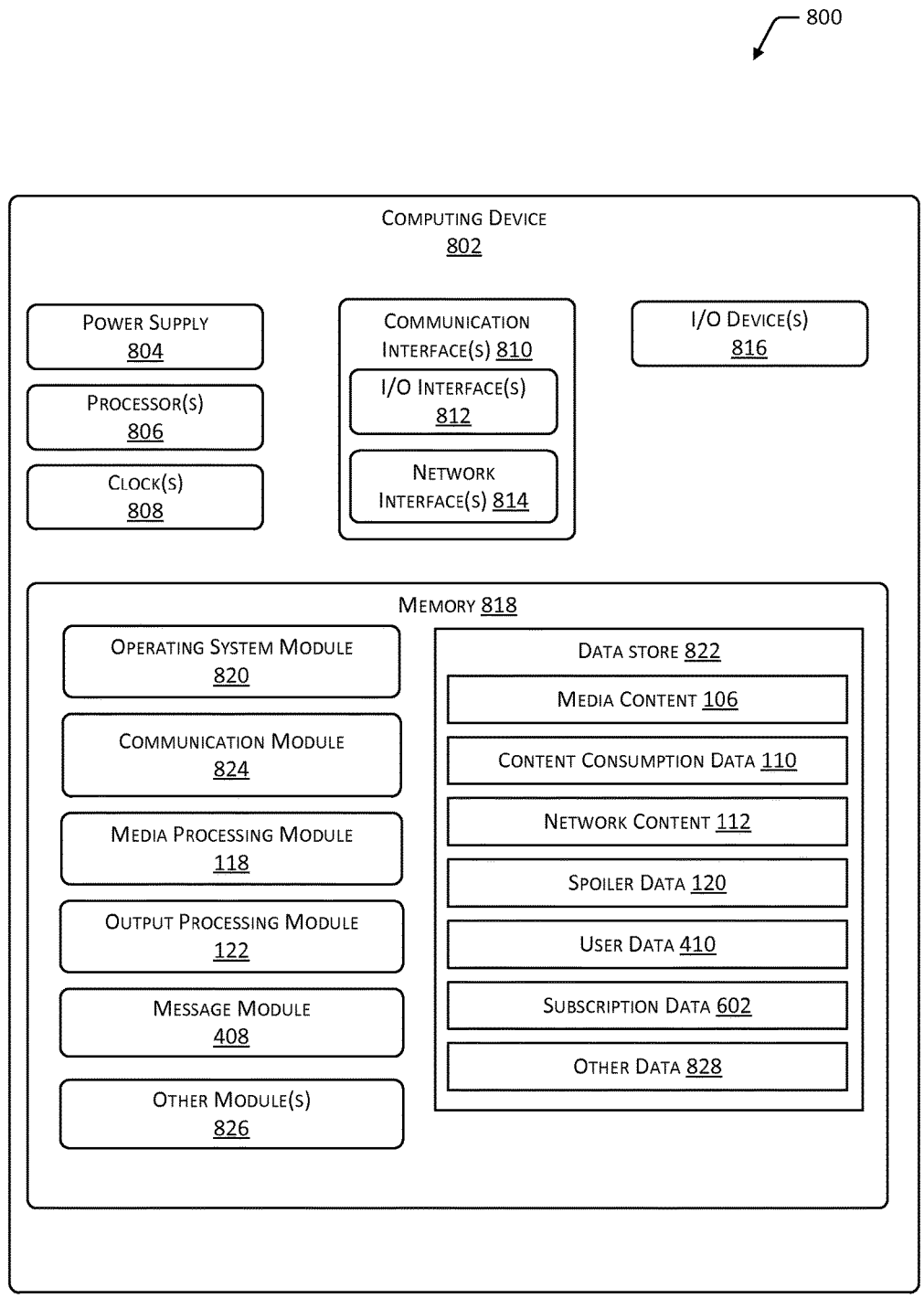
FIG. 8 is a block diagram illustrating a computing device within the scope of the present disclosure.

FIG. 8 is a block diagram 800 illustrating a computing device 802 within the scope of the present disclosure. The computing device 802 may include one or more user devices 104, media servers 108, web servers 114, output servers 116, computing devices 802 associated with content providers 604, or other devices in communication therewith. Any type of computing device 802 and any number of networked computing devices 802 may perform the implementations described herein.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with the computing device 802. For example, I/O devices 816 may include touch sensors, keyboards, mouse devices, microphones, image sensors (e.g., cameras), scanners, displays, speakers, haptic devices, printers, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including local area networks (LANs), wireless LANs, wide area networks (WANs), wireless WANs, and so forth. For example, the network interfaces 814 may include devices compatible with Ethernet, Wi-Fi®, Bluetooth®, ZigBee®, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD® operating system as promulgated by the FreeBSD Project; UNIX® or a UNIX-like operating system; a variation of the Linux® operating system as promulgated by Linus Torvalds; the Windows® operating system from Microsoft Corporation of Redmond, Wash., USA; or other operating systems.

A data store 822 and one or more of the following modules may also be stored in the memory 818. The modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

A communication module 824 may be configured to establish communications with one or more other computing devices 802, such as user devices 104, media servers 108, web servers 114, output servers 116, and computing devices 802 associated with content providers 604. The communications may be authenticated, encrypted, and so forth.

The memory 818 may store the media processing module 118. The media processing module 118 may process media content 106 to determine spoiler data 120, media content characteristics 728, and media metadata characteristics 730. For example, the media processing module 118 may include any manner of text recognition or natural language processing software, which may be used to process alphanumeric data contained in the media content 106. In some implementations, the media processing module 118 may include speech-to-text software for processing audio data to determine alphanumeric data. The resulting alphanumeric data may then be processed using text recognition or natural language processing software. The media processing module 118 may include any manner of image recognition software, including but not limited to OCR. For example, the media processing module 118 may determine text from an image that depicts words or numerals. As another example, the media processing module 118 may determine image characteristics, such as the presence or absence of particular characters, objects, colors, shapes, and so forth. In other implementations, the media processing module 118 may include audio recognition software or video recognition software that may be used to determine specific audio or video content within the media content 106. For example, the media processing module 118 may determine the presence of a particular song or the voice of a particular performer in a video or an audio soundtrack. The determined spoiler data 120, media content characteristics 728, and media metadata characteristics 730 may be indicative of plots, events, characters, or other elements within media content 106.

The memory 818 may also store the output processing module 122. The output processing module 122 may also determine correspondence between network content 112 accessed by the user device 104 and the spoiler data 120. For example, the output processing module 122 may perform any manner of text, video, audio, or image recognition, OCR, natural language processing, or other processing techniques on the network content 112, including, but not limited to those described with respect to the media processing module 118. Correspondence between the processed network content 112 and the spoiler data 120 may indicate that the network content 112 includes information relevant to particular media content 106.

The output processing module 122 may also access user data 410, subscription data 602, and content consumption data 110 associated with a particular user account or user device 104. Correspondence between the user data 410 and the network metadata 714 indicating eligible recipients of the network content 112 may indicate that the user device 104 may access the network content 112. Correspondence between the subscription data 602 and the network content 112 may indicate that the user has elected to access the network content 112. A lack of correspondence between the content consumption data 110 and the media content 106 associated with the network content 112 may indicate that the user device 104 has not previously accessed the media content 106 described in the network content 112. Based on the lack of correspondence between the content consumption data 110 and the media content 106 associated with the network content 112, the output processing module 122 may suppress at least a portion of the network content 112 from output. The manner in which the network content 112 is suppressed may be determined based at least partly on user preferences 734.

The memory 818 may further store the message module 408. The message module 408 may determine messages from one or more user devices 104 or devices associated with content providers 604, the messages including message content 404, an indication of a message location 402, and an indication of one or more message recipients 406. The message module 408 may further determine correspondence between the message recipients 406 and user data 410 indicative of one or more user accounts or user devices 104. The message module 408 may provide the message content 404 to the determined user device(s) 104 to be stored in association with media content 106 at a location corresponding to the message location 402. One or more of the message module 408 or the output processing module 122 may determine correspondence between content consumption data 110 associated with the determined user device(s) 104 and the message location 402. If correspondence is determined, an indication of the message content 404 may be output. If correspondence is not determined, the message content 404 may be suppressed from output.

Other modules 826 may also be present in the memory 818. For example, encryption modules may be used to encrypt and decrypt communications between computing devices 802. Authentication modules may be used to authenticate communications sent or received by computing devices 802. Other modules 826 may further include a user interface module, which may receive and process user interactions associated with media content 106, network content 112, message content 404, and so forth. For example, other modules 826 may include browser modules, search interfaces, and so forth.

Other data 828 within the data store 822 may include user input data, such as configurations and settings associated with computing devices 802. Other data 828 may include security data, such as encryption keys and schema, access credentials, and so forth. Other data 828 may also include social network data, which may indicate connections between user accounts or user devices 104 within a social graph. For example, a first user may provide subscription data 602 indicating a desire to receive output 102 associated with other users connected to the first user within a social network. As another example, a first user may designate a group of users connected to the first user within a social network as message recipients 406.

In different implementations, different computing devices 802 may have different capabilities or capacities. For example, output servers 116 may have significantly more processor 806 capability and memory 818 capacity compared to the processor 806 capability and memory 818 capacity of user devices 104.

Embodiments of the disclosure can be described in view of the following clauses:

Clause 1: A system comprising one or more memories storing computer-executable instructions and one or more hardware processors configured to execute the computer-executable instructions to: receive an indication of a first portion of first media content presented on a first device; determine spoiler data based at least partly on the first media content, the spoiler data indicative of language, images, or sounds associated with the first media content; receive a message from the first device, the message including message content and at least one identifier indicative of a user account associated with a second device, the message being associated with the first portion of the first media content; determine second media content stored in association with the second device, the second media content corresponding to the first media content on the first device; provide the message content to the second device; store the message content in association with the second device and further in association with a second portion of the second media content, the second portion corresponding to the first portion stored on the first device; determine correspondence between the message content and the spoiler data; access content consumption data associated with the second device, the content consumption data indicating one or more portions of media content previously accessed by the second device, the content consumption data indicating a lack of previous access to the second portion of the second media content; prevent output of the message content based on the correspondence between the message content and the spoiler data and the lack of previous access to the second portion of the second media content; determine access by the second device to the second portion of the second media content; and cause output of the message content to the second device responsive to the access of the second portion of the second media content by the second device.

Clause 2: The system of clause 1, further comprising computer-executable instructions to: present an indication of the message content to the second device proximate to the second portion of the second media content; and receive selection of the indication of the message content; wherein the output of the message content to the second device is performed responsive to the selection of the indication of the message content.

Clause 3: The system of any one or more of clause 1 or 2, further comprising computer-executable instructions to: determine subscription data associated with the second device, the subscription data indicative of one or more sources of the message content; and determine the one or more sources of the message content to include the first device; wherein the output of the message content to the second device is performed responsive to the determination that the subscription data is indicative of the first device.

Clause 4: The system of any one or more of clauses 1 through 3, further comprising computer-executable instructions to: determine filter data associated with the second device, the filter data indicative of one or more categories or characteristics of the message content to be suppressed from the output; and determine a difference between one or more of a category or a characteristic of the message content and the filter data; wherein the output of the message content to the second device is performed responsive to the difference between the one or more of the category or the characteristic of the message content and the filter data.

Clause 5: A method comprising: receiving an indication of a portion of media content from a first device associated with a user account; providing a user interface to the first device associated with the user account, the user interface configured to receive message content and one or more identifiers indicative of recipients for the message content; receiving user input via the user interface, the user input including the message content and the one or more identifiers indicative of recipients, the message content associated with the portion of the media content; determining a second device associated with the one or more identifiers indicative of the recipients; and providing at least a portion of the message content to the second device for storage in association with a corresponding portion of media content, the corresponding portion of the media content stored on the second device, the message content configured for output upon access of the corresponding portion of the media content by the second device.

Clause 6: The method of clause 5, further comprising determining access of the portion of the media content by the second device by: accessing content consumption data associated with one or more of the second device or a second user account associated with the second device, the content consumption data indicating one or more portions of the media content previously accessed by the one or more of the second device or the second user account associated with the second device.

Clause 7: The method of any one or more of clause 5 or clause 6, wherein the message content includes an indication of the message content for output proximate to the corresponding portion of the media content, the method further comprising receiving user input from the second device associated with the indication of the message content, the user input configured to cause output of the at least a portion of the message content.

Clause 8: The method of clause 7, further comprising: determining one or more of: a source of the message content, a characteristic of the message content, or a characteristic of the source of the message content; and providing the indication of the message content with one or more of a shape, a color, or alphanumeric data indicative of the one or more of: the source of the message content, the characteristic of the message content, or the characteristic of the source of the message content.

Clause 9: The method of any one or more of clauses 5 through 8, further comprising: determining correspondence between the first device or a user account associated with the message and subscription data associated with the second device, the subscription data indicative of one or more devices or user accounts configured to provide messages; wherein providing the at least a portion of the message content is performed responsive to the correspondence between the user account and the subscription data.

Clause 10: The method of any one or more of clauses 5 through 9, further comprising: determining a difference between filter data associated with one or more of the second device or a second user account associated with the second device and one or more of the user account associated with the message, a characteristic of the message, or a characteristic of the message content; the filter data indicative of one or more of: characteristics of messages, characteristics of message content, characteristics of user accounts, characteristics of devices, particular user accounts, or particular devices to be suppressed from the output presented by the second device; wherein providing the at least a portion of the message content is performed responsive to the difference between the filter data and the one or more of user account associated with the message, the characteristic of the message, or the characteristic of the message content.

Clause 11: The method of any one or more of clauses 5 through 10, wherein the one or more identifiers indicative of the recipients include an indication that the message is a public message accessible to users that select to receive the public message, the method further comprising: accessing subscription data associated with one or more of the second device or a second user account associated with the second device, the subscription data indicating one or more devices or user accounts configured to provide messages; and determining correspondence between the subscription data and the user account; wherein providing of the at least a portion of the message content is performed responsive to the correspondence between the subscription data and the user account.

Clause 12: The method of any one or more of clauses 5 through 11, wherein the one or more identifiers indicative of the recipients include an indication that the message is associated with a social network of the user account, the method further comprising: determining first social network data associated with the user account, the first social network data indicating one or more of devices or user accounts connected to the user account within a first social graph; determining second social network data associated with one or more of the second device or a second user account associated with the second device, the second social network data indicating one or more of devices or user accounts connected to the one or more of the second device or the second user account associated with the second device within a second social graph; and determining correspondence between the first social network data and the second social network data; wherein providing of the at least a portion of the message content is performed responsive to the correspondence between the first social network data and the second social network data.

Clause 13: The method of any one or more of clauses 5 through 12, further comprising: determining rating data associated with one or more of the user account or the message content, the rating data indicative of user input received responsive to accessing content associated with the user account; determining subscription data associated with the second device to include a rating threshold; and determining correspondence between the rating data and the rating threshold; wherein providing the at least a portion of the message content is performed responsive to the correspondence between the rating data and the rating threshold.

Clause 14: A system comprising one or more memories storing computer-executable instructions and one or more hardware processors configured to execute the computer-executable instructions to: access a message associated with a first user account associated with a first user, the message indicating a particular portion of media content; determine subscription data associated with a second user account associated with a second user, the subscription data indicating the first user account; and based at least partly on the subscription data, provide the message to a device associated with the second user account for storage in association with the particular portion of the media content the message content configured for output upon access of the corresponding portion of the media content by the second user account.

Clause 15: The system of clause 14, further comprising computer-executable instructions to: access the subscription data associated with the second user account, the subscription data indicative of one or more of user accounts, devices, messages, or message characteristics associated with automatic output of messages; determine a difference between the subscription data and the first user account; responsive to the difference, provide an indication of the message to the device associated with the second user account; and receive user input from the device associated with the second user account, the user input selecting the indication of the message.

Clause 16: The system of any one or more of clauses 14 or 15, further comprising computer-executable instructions to: determine rating data associated with one or more of the message or the first user account, the rating data indicative of user input received responsive to the one or more of the message or the first user account; determine a threshold rating associated with the second user account; and determine correspondence between the threshold rating and the rating data; wherein providing of the message is further performed responsive to the correspondence between the threshold rating and the rating data.

Clause 17: The system of any one or more of clauses 14 through 16, further comprising computer-executable instructions to: determine an indication of a group of recipients associated with the first user account; determine creation of a third user account; determine an addition of the third user account to the group of recipients; and provide the message to a second device associated with the third user account in association with the particular portion of the media content.

Clause 18: The system of any one or more of clauses 14 through 17, further comprising computer-executable instructions to: determine content consumption data associated with the second user account, the content consumption data indicating one or more portions of the media content previously accessed by the second user account; wherein providing of the message is performed responsive to correspondence between the content consumption data and the particular portion of the media content.

Clause 19: The system of any one or more of clauses 14 through 18, wherein the message further includes time data indicative of one or more of a length of time or a particular time, the message configured for output responsive to the one or more of the passage of the length of time or the occurrence of the particular time.

Clause 20: The system of any one or more of clauses 14 through 18, wherein the message further includes first location data indicative of one or more locations, the system further comprising computer-executable instructions to: determine second location data associated with the second user account, the second location data indicating one or more of a current location or a previous location of the device associated with the second user account; and determine correspondence between the first location data and the second location data; wherein message configured for output responsive to the correspondence between the first location data and the second location data.

Clause 21: A system comprising one or more memories storing computer-executable instructions and one or more hardware processors configured to execute the computer-executable instructions to: determine media content including one or more of alphanumeric data, audio data, image data, or video data; determine content consumption data associated with a user account, the content consumption data indicative of one or more portions of the media content previously accessed by the user account; determine access by the user account to network content; determine correspondence between the network content and the spoiler data, the correspondence between the network content and the spoiler data indicating that the network content includes one or more of alphanumeric data, audio data, image data, or video data that corresponds to one or more portions of the media content; determine a difference between the one or more portions of the media content of the content consumption data and the media content associated with the network content, the difference indicating a lack of previous access to the information associated with the media content by the user account; and based on the correspondence between the network content and the spoiler data and the difference between the one or more portions of the media content and the content consumption data, suppress output of at least a portion of the network content.

Clause 22: The system of clause 21, further comprising computer-executable instructions to: determine a second user account associated with the network content; determine second content consumption data associated with the second user account; and determine a difference between the second content consumption data associated with the second user account and the content consumption data associated with the user account, the difference indicating that the second user account has previously accessed the information corresponding to the lack of previous access of the user account.

Clause 23: The system of any one or more of clauses 21 or 22, further comprising computer-executable instructions to: receive user input associated with the user account, the user input indicating a level of suppression associated with particular media content; and determine the network content to include the information associated with the particular media content; wherein the computer-executable instructions to suppress the output of the at least a portion of the network content include computer executable instructions to: based at least partly on the level of suppression, perform one or more of: provide a notification proximate to the network content, the notification indicating that the network content includes information associated with the particular media content; obfuscate the at least a portion of the network content; or suppress one or more of display or audio output of the network content.

Clause 24: The system of any one or more of clauses 21 through 23, further comprising computer-executable instructions to generate the spoiler data by one or more of: performing natural language processing on the alphanumeric data associated with an e-book; performing natural language processing on the alphanumeric data associated with captions of one or more of video content or image content; performing natural language processing on the alphanumeric data determined by performing the speech-to-text processing on audio content; performing image recognition on the one or more of the video content or the image content; or performing audio recognition on the audio content.

Clause 25: A method comprising: determining access by a user account to network content; determining correspondence between media content and at least a portion of the network content; determining a difference between the at least a portion of the network content and content consumption data indicative of media content previously accessed by the user account; and based at least partly on the difference between the at least a portion of the network content and the content consumption data, suppressing output of the at least a portion of the network content.

Clause 26: The method of clause 25, further comprising: generating spoiler data by performing one or more of: natural language processing, speech-to-text processing, audio recognition, or image recognition on at least a portion of the media content, the spoiler data including one or more of alphanumeric data, audio data, image data, or video data that corresponds to one or more portions of the media content; wherein determining the correspondence between the media content and the at least a portion of the network content includes determining correspondence between at least a portion of the spoiler data and the at least a portion of the network content.

Clause 27: The method of any one or more of clauses 25 or 26, further comprising: determining a source associated with the network content; and determining rating data associated with the source, the rating data indicative of user input received responsive to accessing content associated with the source; wherein the suppressing of the output of the at least a portion of the network content is further based at least partly on the rating data.

Clause 28: The method of any one or more of clauses 25 through 27, further comprising: determining a second user account associated with the network content; and determining second content consumption data indicative of media content previously accessed by the second user account; wherein determining the difference between the media content and the at least a portion of the network content includes determining correspondence between the content consumption data associated with the user account and the second content consumption data associated with the second user account.

Clause 29: The method of any one or more of clauses 25 through 28, further comprising: receiving user preference data associated with the user account, the user preference data indicative of one or more particular portions of the media content to be suppressed from output; and determining correspondence between the at least a portion of the network content and the user preference data; wherein the suppressing of the output of the at least a portion of the network content is further based at least partly on the correspondence between the at least a portion of the network content and the user preference data.

Clause 30: The method of any one or more of clauses 25 through 29, further comprising: using a browser to suppress the output of the at least a portion of the network content, based at least partly on the difference between the at least a portion of the network content and the content consumption data; the output including a first portion provided to an output device and a second portion suppressed from output to the output device.

Clause 31: The method of any one or more of clauses 25 through 30, further comprising: providing a search interface to a device associated with the user account; and receiving user input to the search interface; the network content including a suggested search query based on the user input to the search interface; at least a portion of the suggested search query being suppressed from output based on correspondence between the media content and the at least a portion of the suggested search query and a difference between the content consumption data and the at least a portion of the suggested search query.

Clause 32: The method of any one or more of clauses 25 through 31, further comprising: receiving the network content from a source associated with the media content; and receiving a designation of the network content from the source associated with the network content, the designation being indicative of one or more of suppression or output of the network content; wherein the suppressing of the output of the at least a portion of the network content is further based at least partly on the designation.

Clause 33: A system comprising one or more memories storing computer-executable instructions and one or more hardware processors configured to execute the computer-executable instructions to: process media content to determine spoiler data associated with the media content, the spoiler data including one or more of alphanumeric data, audio data, image data, or video data that corresponds to one or more portions of the media content; determine correspondence between the spoiler data and network content accessed by a user account, the correspondence indicating that at least a portion of the network content includes information corresponding to one or more portions of the media content; determine correspondence between the network content and content consumption data associated with the user account, the content consumption data indicative of the media content previously accessed by the user account; generate an output indicative of the network content; and based at least partly on the correspondence between the network content and the content consumption data, suppress at least a portion of the output.

Clause 34: The system of clause 33, wherein the computer-executable instructions to process the media content to determine the spoiler data include computer-executable instructions to perform one or more of: natural language processing on alphanumeric data; speech-to-text processing on audio data; audio recognition on audio data; or image recognition on one or more of image data or video data.

Clause 35: The system of any one or more of clauses 33 or 34, further comprising computer-executable instructions to: receive the network content from a source associated with the media content, the network content including a designation indicative of one or more portions of the network content to be output; wherein the computer-executable instructions to suppress the at least a portion of the output further suppress the at least a portion of the output based at least partly on the designation of the network content.

Clause 36: The system of any one or more of clauses 33 through 35, further comprising computer-executable instructions to: determine a source associated with the network content; and determine one or more of rating data or content consumption data associated with the source; wherein the computer-executable instructions to suppress the at least a portion of the output further suppress the at least a portion of the output based at least partly on the one or more of the rating data or the content consumption data associated with the source.

Clause 37: The system of any one or more of clauses 33 through 36, wherein the computer-executable instructions to suppress the at least a portion of the output includes computer-executable instructions to: display a first portion of the output; and obfuscate a second portion of the output.

Clause 38: The system of any one or more of clauses 33 through 37, wherein the computer-executable instructions to suppress the at least a portion of the output include computer-executable instructions to: provide a notification to the user account, the notification indicative of the correspondence between the spoiler data and the network content; receive user input responsive to the notification; and provide the at least a portion of the output responsive to the user input.

Clause 39: The system of any one or more of clauses 33 through 38, further comprising computer-executable instructions to generate the content consumption data by: determining first media content accessed by the user account, the first media content including one or more of alphanumeric data, audio data, image data, or video data associated with a first format; provide the content consumption data with an indication of the first media content; determine second media content corresponding to the first media content, the second media content including the one or more of alphanumeric data, audio data, image data, or video data associated with a second format; and provide the content consumption data with an indication of the second media content.

Clause 40: The system of any one or more of clauses 33 through 39, further comprising computer-executable instructions to: receive user input associated with the user account, the user input indicating a level of suppression associated with particular media content; and determine the network content to include information associated with the particular media content; wherein the computer-executable instructions to modify the output further modify the output based at least partly on the level of suppression.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
receive an indication of a first portion of first media content presented on a first device;
determine spoiler data based at least partly on the first media content, the spoiler data indicative of language, images, or sounds associated with the first media content;
receive a message from the first device, the message including message content and at least one identifier indicative of a user account associated with a second device, the message being associated with the first portion of the first media content;
determine second media content stored in association with the second device, the second media content corresponding to the first media content on the first device;
provide the message content to the second device;
store the message content in association with the second device and further in association with a second portion of the second media content, the second portion corresponding to the first portion stored on the first device;
determine correspondence between the message content and the spoiler data;
access content consumption data associated with the second device, the content consumption data indicating one or more portions of media content previously accessed by the second device, the content consumption data indicating a lack of previous access to the second portion of the second media content;
prevent output of the message content based on the correspondence between the message content and the spoiler data and the lack of previous access to the second portion of the second media content;
determine access by the second device to the second portion of the second media content; and
cause the output of the message content to the second device responsive to the access of the second portion of the second media content by the second device.

2. The system of claim 1, further comprising computer-executable instructions to:
present an indication of the message content to the second device proximate to the second portion of the second media content; and
receive selection of the indication of the message content;
wherein the output of the message content to the second device is performed responsive to the selection of the indication of the message content.

3. The system of claim 1, further comprising computer-executable instructions to:
determine subscription data associated with the second device, the subscription data indicative of one or more sources of the message content; and
determine the one or more sources of the message content to include the first device;
wherein the output of the message content to the second device is performed responsive to the determination that the subscription data is indicative of the first device.

4. The system of claim 1, further comprising computer-executable instructions to:
determine filter data associated with the second device, the filter data indicative of one or more categories or characteristics of the message content to be suppressed from the output; and
determine a difference between one or more of a category or a characteristic of the message content and the filter data;
wherein the output of the message content to the second device is performed responsive to the difference between the one or more of the category or the characteristic of the message content and the filter data.

5. A method comprising:
receiving an indication of a portion of media content from a first device associated with a user account;
providing a user interface to the first device associated with the user account, the user interface configured to receive message content and one or more identifiers indicative of recipients for the message content;
receiving user input via the user interface, the user input including the message content and the one or more identifiers indicative of recipients, wherein the message content is associated with the portion of the media content;
determining a second device associated with the one or more identifiers indicative of the recipients;
accessing filter data associated with one or more of the second device or a second user account associated with the second device, wherein the filter data is indicative of one or more of: characteristics of messages, characteristics of the message content, characteristics of user accounts, characteristics of devices, particular user accounts, or particular devices to be suppressed from the output presented by the second device;
determining a difference between the filter data and one or more of the user account associated with the message, a characteristic of the message, or a characteristic of the message content;
in response to the difference between the filter data and the one or more of the user account associated with the message, the characteristic of the message, or the characteristic of the message content, providing at least a portion of the message content to the second device for storage in association with a corresponding portion of the media content, the corresponding portion of the media content stored on the second device;
determining access of the corresponding portion of the media content by the second device; and
causing output of one or more of the message content or an indication of the message content responsive to the access of the corresponding portion of the media content by the second device.

6. The method of claim 5, wherein the determining the access of the portion of the media content by the second device includes:
accessing content consumption data associated with the one or more of the second device or the second user account associated with the second device; and
determining, based in part on the content consumption data, one or more portions of the media content previously accessed by the one or more of the second device or the second user account associated with the second device.

7. The method of claim 5, further comprising:
receiving user input from the second device associated with the indication of the message content, the user input from the second device configured to cause output of the at least a portion of the message content.

8. The method of claim 7, further comprising:
determining one or more of: a source of the message content, a characteristic of the message content, or a characteristic of the source of the message content; and
providing the indication of the message content with one or more of a shape, a color, or alphanumeric data indicative of the one or more of: the source of the message content, the characteristic of the message content, or the characteristic of the source of the message content.

9. The method of claim 5, further comprising:
accessing subscription data associated with the one or more of the second device or the second user account, the subscription data indicative of one or more devices or user accounts configured to provide messages; and
determining correspondence between the subscription data and one or more of the first device or the user account associated with the message;
wherein providing the at least a portion of the message content is performed responsive to the correspondence between the subscription data and the one or more of the first device or the user account.

10. The method of claim 5, wherein the one or more identifiers indicative of the recipients include an indication that the message is a public message accessible to users that select to receive the public message, the method further comprising:
accessing subscription data associated with the one or more of the second device or the second user account associated with the second device, the subscription data indicating one or more devices or user accounts configured to provide messages; and
determining correspondence between the subscription data and the user account associated with the message;
wherein providing of the at least a portion of the message content is performed responsive to the correspondence between the subscription data and the user account associated with the message.

11. The method of claim 5, wherein the one or more identifiers indicative of the recipients include an indication that the message is associated with a social network of the user account, the method further comprising:

determining first social network data associated with the user account, the first social network data indicating one or more of devices or user accounts connected to the user account within a first social graph;
determining second social network data associated with the one or more of the second device or the second user account associated with the second device, the second social network data indicating one or more of devices or user accounts connected to the one or more of the second device or the second user account associated with the second device within a second social graph; and
determining correspondence between the first social network data and the second social network data;
wherein providing of the at least a portion of the message content is performed responsive to the correspondence between the first social network data and the second social network data.

12. The method of claim 5, further comprising:
determining rating data associated with one or more of the user account or the message content, the rating data indicative of user input received responsive to accessing content associated with the user account;
determining subscription data associated with the second device to include a rating threshold; and
determining correspondence between the rating data and the rating threshold;
wherein providing the at least a portion of the message content is performed responsive to the correspondence between the rating data and the rating threshold.

13. A system comprising:
one or more memories storing computer-executable instructions; and
one or more hardware processors configured to execute the computer-executable instructions to:
access a message associated with a first user account associated with a first user, the message indicating a particular portion of media content;
determine subscription data associated with a second user account associated with a second user, the subscription data indicating the first user account;
determine correspondence between the subscription data and the first user account;
based at least partly on the correspondence between the subscription data and the first user account, provide the message to a device associated with the second user account for storage in association with the particular portion of the media content, wherein an indication of the message is configured for output upon access of the particular portion of the media content by the second user account;
provide the indication of the message to the device associated with the second user account;
receive user input from the device associated with the second user account, the user input selecting the indication of the message; and
output at least a portion of the message responsive to the user input.

14. The system of claim 13, further comprising computer-executable instructions to:
determine rating data associated with one or more of the message or the first user account, the rating data indicative of user input received responsive to the one or more of the message or the first user account;
determine a threshold rating associated with the second user account; and determine correspondence between the threshold rating and the rating data;
wherein providing of the message is further performed responsive to the correspondence between the threshold rating and the rating data.

15. The system of claim 13, further comprising computer-executable instructions to:
determine an indication of a group of recipients associated with the first user account;
determine creation of a third user account;
determine an addition of the third user account to the group of recipients; and
provide the message to a second device associated with the third user account in association with the particular portion of the media content.

16. The system of claim 13, further comprising computer-executable instructions to:
determine content consumption data associated with the second user account, the content consumption data indicating one or more portions of the media content previously accessed by the second user account;
wherein providing of the message is performed responsive to correspondence between the content consumption data and the particular portion of the media content.

17. The system of claim 13, wherein the message further includes time data indicative of one or more of a length of time or a particular time, and the message is configured for output responsive to the one or more of the passage of the length of time or the occurrence of the particular time.

18. The system of claim 13, wherein the message further includes first location data indicative of one or more locations, the system further comprising computer-executable instructions to:
determine second location data associated with the second user account, the second location data indicating one or more of a current location or a previous location of the device associated with the second user account; and
determine correspondence between the first location data and the second location data;
wherein the message is configured for output responsive to the correspondence between the first location data and the second location data.

19. A method comprising:
receiving an indication of a portion of media content from a first device associated with a first user account;
providing a user interface to the first device, the user interface configured to receive message content and one or more identifiers indicative of recipients for the message content;
receiving user input via the user interface, the user input including the message content and the one or more identifiers indicative of recipients, wherein the message content is associated with the portion of the media content;
determining one or more of a second device or a second user account associated with the one or more identifiers indicative of the recipients;
determining first social network data associated with the first user account, the first social network data indicating one or more of devices or user accounts connected to the user account within a first social graph;
determining second social network data associated with the one or more of the second device or the second user account, the second social network data indicating one or more of devices or user accounts connected to the one or more of the second device or the second user account within a second social graph;
determining correspondence between the first social network data and the second social network data;
in response to the correspondence, providing at least a portion of the message content to the second device for storage in association with a corresponding portion of the media content, the corresponding portion of the media content stored on the second device;
determining access of the corresponding portion of the media content by the second device; and
causing output of one or more of the message content or an indication of the message content responsive to the access of the corresponding portion of the media content by the second device.

20. A method comprising:
receiving an indication of a portion of media content from a first device associated with a first user account;
providing a user interface to the first device, the user interface configured to receive message content and one or more identifiers indicative of recipients for the message content;
receiving user input via the user interface, the user input including the message content and the one or more identifiers indicative of recipients, wherein the message content is associated with the portion of the media content;
determining one or more of a second device or a second user account associated with the one or more identifiers indicative of the recipients;
determining rating data associated with one or more of the message content or the first user account, the rating data indicative of user input received responsive to the one or more of the message content or the first user account;
determining a threshold rating associated with the one or more of the second device or the second user account;
determining correspondence between the threshold rating and the rating data;
in response to the correspondence, providing at least a portion of the message content to the second device for storage in association with a corresponding portion of the media content, the corresponding portion of the media content stored on the second device;
determining access of the corresponding portion of the media content by the second device; and
causing output of one or more of the message content or an indication of the message content responsive to the access of the corresponding portion of the media content by the second device.

* * * * *